United States Patent [19]
Shinomiya

[11] Patent Number: 6,016,430
[45] Date of Patent: Jan. 18, 2000

[54] RADIO COMMUNICATION SYSTEM AND METHOD FOR AVOIDING CONTROL CHANNEL INTERFERENCE

[75] Inventor: Kiyohiko Shinomiya, Zama, Japan

[73] Assignee: Ricoh Company, Ltd., Tokyo, Japan

[21] Appl. No.: 08/835,028

[22] Filed: Mar. 27, 1997

[30] Foreign Application Priority Data

Mar. 29, 1996 [JP] Japan ................................. 8-077130

[51] Int. Cl.⁷ ............................ H04B 7/005; H04B 7/00; H04J 3/06
[52] U.S. Cl. ........................ 455/515; 455/502; 455/507; 455/561; 370/337; 370/503; 370/350
[58] Field of Search .................................. 455/450, 422, 455/561, 515, 524, 502; 370/337, 347, 503, 509, 510, 514, 350; 375/354, 356

[56] References Cited

U.S. PATENT DOCUMENTS

| | | | |
|---|---|---|---|
| 5,528,597 | 6/1996 | Gerszberg et al. | 455/422 |
| 5,678,181 | 10/1997 | Kamachi | 455/63 |
| 5,724,665 | 3/1998 | Abbasi et al. | 455/561 |
| 5,732,073 | 3/1998 | Kusaki et al. | 370/280 |
| 5,825,817 | 10/1998 | Tanaka et al. | 375/228 |

FOREIGN PATENT DOCUMENTS 7-75166   3/1995   Japan .
7-79470   3/1995   Japan .

*Primary Examiner*—Dwayne D. Bost
*Assistant Examiner*—Raymond B. Persino
*Attorney, Agent, or Firm*—Cooper & Dunham LLP

[57] ABSTRACT

A radio communication system including a plurality of base stations which communicate with a plurality of radio terminals respectively is provided with a capability of avoiding occurrence of radio interference of control channel signals among a plurality of base stations even when a plurality of the base stations are located in the close vicinity of each other. The base station of the radio communication system is provided with a device for receiving, when the power is turned on, a control channel signal which is being transmitted at a certain interval by each of the other base stations in the system, a device for frame synchronizing each of TDMA frames of the control channel signal which is received, a device for extracting base station identification information of each of the other base stations from the TDMA frames which are frame synchronized, and a device for storing in a memory each of the base station identification information which is extracted. The base station further includes a device for determining a cycle of transmitting a superframe signal in accordance with the number of the other base stations using the control channel in the system, which is determined based upon the base station identification information stored in the memory.

38 Claims, 23 Drawing Sheets

RADIO COMMUNICATION SYSTEM AND METHOD FOR AVOIDING CONTROL CHANNEL INTERFERENCE

BACKGROUND OF THE INVENTION

1. Field of the Invention

The present invention relates to a radio communication system, and more particularly to a radio communication system which includes a plurality of base stations which communicate with a plurality of radio terminals respectively over radio waves.

Examples of such a radio communication system include a digital cordless telephone system, a wide area digital cordless telephone system which is called a personal handy phone system (PHS) in Japan and a personal communications services system (PCS) in the United States, a cellular phone system, a wireless printer system, and a wireless local area network system.

2. Discussion of the Background

Radio communications systems are increasingly used for wireless mobile communications.

An example of a radio communication system is a cordless telephone system which is used by individuals in home or office. A cordless telephone system includes at least one telephone base set which communicates with a radio mobile telephone set over a limited distance, such as several tens of meters, for example, by use of radio waves. The base station is electrically connected to a conventional public or private wire telephone network. The base station allows the user of the mobile telephone set to access the wire network while moving from one place to another or from a place distant from the base station in home or office as long as the mobile telephone set is within an area approximately several tens of meters from the base station.

In a cordless telephone system, a specific range of frequencies is assigned to each system and a mobile telephone set in a system can only communicate with a base station in the same system utilizing the same specified range of frequencies.

As understood by those skilled in the art, because only a limited number of frequencies are available for radio communication, the same range of frequencies must be assigned to and used by a plurality of cordless telephone systems. If two systems having the same range of frequencies are placed and used in close proximity to each other, such as in an area within several tens of meters of each other, a radio wave from one base telephone set may interfere with a radio wave from the other base telephone set. As a result, various problems may occur when receiving and sending calls with each of the mobile telephone sets. For example, an incoming call arriving at base telephone set of one of the systems, besides reaching a mobile telephone set within its system, may also reach a mobile telephone set of another system.

Therefore, when one system has a same range of frequencies as another system, the two systems need to be placed in sufficiently separated areas for avoiding such an interference problem.

Recently, radio communication systems have been proposed which allow the user of a mobile telephone set of a cordless telephone system to access a wire network not only in home or office but also in public places, outside of the home and office, such as on streets in business and shopping quarters.

Such wide area radio communication systems include a plurality of base stations. Each of the plurality of base stations is capable of communicating with a plurality of mobile radio terminals over a limited distance.

Generally a certain spectrum of frequencies is allocated for use in a wide area radio communication system. Because of the limited number of radio frequencies which are available in the allocated spectrum, the same plurality of ranges of frequencies within the allocated spectrum are allocated to and used by each of a plurality of base stations, and each of the plurality of base stations is placed in an area separated from each other, thus covering a wide area.

An example of such a wide area radio communication system is a system called DECT (Digital European Cordless Communications) in Europe. Another example is a personal handy phone system called PHS in Japan. Similar systems have been proposed in the United States and are referred to as personal communications services (PCS) systems.

Recent wide-area radio communication systems, such as the personal handy phone system (PHS) and the personal communications services (PCS) systems, provide mobile radio voice, data, video and/or multimedia communications using mobile radio terminals, which include a radio telephone, such as a cellular telephone, and other components for voice, data, video and/or multimedia communications.

In the personal handy phone system (PHS), as an example of such a wide area radio communication system including a plurality of base stations which communicate with a plurality of mobile radio terminals, each of the base stations is electrically connected to conventional public and private wire telephone networks and is capable of simultaneously communicating with a plurality of mobile radio terminals over a limited distance, such as for example, several tens of meters. In the PHS system, the base station is called a cell station and the mobile radio terminal is called a personal station, and are hereinafter called as such when referring to the PHS system.

For accomplishing multiple radio access and transmission between a cell station and a plurality of personal stations, a Time-Division Multiple Access (TDMA) architecture and a Time Division Duplex (TDD) architecture are used in the PHS system.

A digital signal carried by a radio wave which is radiated by each of the cell stations and the personal stations is divided into 5 ms time segments, and each segment is defined as a TDMA frame.

Each frame is further divided into 8 time slots. Accordingly, the time allocated for each slot is 625 $\mu$s. Of the 8 slots, four slots are assigned for downlink (transmission from a cell station to a personal station) channels and four slots are assigned for uplink (transmission from a personal station to a cell station) channels.

One slot of each four slots is used as a slot for setting function channels for transmitting control information necessary for controlling the connection between the cell station and the personal station and is called a control channel. Function channels for transmitting control information include, for example, a broadcast control channel (BCCH) for broadcasting control information, and a common control channel (CCCH) for transmitting control information necessary for call connection between the cell station and the personal station and so forth. The control channel is commonly used by each of the personal stations.

The other three slots each are used as slots for communication and are called communication channels. Each of the communication channels is allocated to and used by an individual user (a personal station).

The cell station broadcasts to all personal stations, with the broadcast control channel (BCCH), control information related to a channel structure and system information such as information regarding the slots which are available for transmitting control information for obtaining a communication channel. A personal station receives such information and transmits, for example, information for informing its current location to the system which is necessary for receiving a call addressed to the personal station.

In the PHS system, there are provided three communication protocol phases, a phase for establishing the radio interface handshake, which is called link channel establishment phase, a phase for connecting a call between the cell station and the personal station which established the handshake, which is called a service channel establishment phase and a phase for performing communication and data transmission, which is called a communication phase.

The link channel establishment phase is defined as the stage for using control channel functions to select a channel (link channel) with the quality and capacity required for each call connection.

Function channels used in the link establishment phase are called a logical control channel (LCCH). As downlink logical control (LCCH) elements, there are a broadcast control channel (BCCH), a paging channel (PCH) which is a one-way point-multipoint channel that simultaneously transmits identical information to individual cell stations and a signaling control channel (SCCH) which is a bi-directional point-point channel that transmits information needed for call connection between the cell station and a personal station.

Each of the cell stations intermittently transmits the control channel signal which indicates a structure of the logical control channel (LCCH) transmitted by the cell station and the positions of the control channel with which transmission is possible for each of the personal stations.

The minimum cycle of the downlink logical control channel (LCCH) specifying the slot position of all logical control channel (LCCH) elements is called a LCCH superframe.

In a radio communication system including a plurality of base stations which communicate with a plurality of radio terminals, such as the above-described PHS system, when a base station is located in the vicinity of another base station and both base stations broadcast a control channel signal at the same time, for example, a problem occurs because the broadcasting radio waves interfere with each other, since a same range of frequencies is used by each of the base stations. If such interference occurs, radio terminals can not receive the broadcasting radio wave and consequently the radio terminals cannot communicate with the base station. As a result, a call addressed to a radio terminal and arriving from a corresponding base station may not be received by the radio terminal or a call originating from the radio terminal may not reach the base station.

For avoiding occurrence of such interference of control channel signals among a plurality of base stations, a technology exists to randomly change a timing at which a control channel signal is broadcast and is disclosed in Japanese Patent publication Toku-kai-hei No.7-75166. However, even if the timing for broadcasting the control channel signal is changed at random, the occurrence of interference of the control channel signals is not completely avoided since the changed timing for broadcasting the control channel signal might still coincide with the timing for broadcasting the control channel signal by one of the other base stations.

As the number of base stations in the system increases, the amount of traffic on the control channel signal increases and consequently the frequency of occurrence of interference of the control channel signals increases. This may result in a situation in which a base station can not broadcast the control channel signal due to busy traffic on the control channel signal.

In an attempt to solve such a problem of interference of the control channel signals, a cordless telephone system which is used in an office, as an example of a radio communication system including a plurality of base stations which communicate with a plurality of radio terminals, can provide two control channel signals at different frequencies. Each base station is allocated one of the two control channel signals.

However, in such a system utilizing two control channel signals, as the number of base stations increases, a situation may occur in which the traffic on at least one of the two control channel signals increases and becomes busy while the traffic on the other control channel signal is relatively light. This is because each base station is allocated one of the two control channel signal frequencies and such allocated control channel signal can not be changed. Therefore, even with such a system using two control channel signals, interference of control channel signals among a plurality of base stations still occurs when the plurality of the base stations are located in close proximity to each other.

SUMMARY OF THE INVENTION

The present invention has been made in view of such problems and to address and solve the problems.

Accordingly, a first object of the present invention is to provide a novel radio communication system including a plurality of base stations which communicate with a plurality of radio terminals respectively and a method for communication capable of avoiding occurrence of radio interference of control channel signals among a plurality of base stations even when a plurality of the base stations are located in the close vicinity to each other.

A second object of the present invention is to provide a radio communication system, which uses two control channel signals having different frequencies, with a capability of avoiding a problem in which traffic on one of the two control channel signals becomes concentrated while the traffic on the other control channel signal is relatively light.

In order to achieve the above-mentioned first object, each base station of the radio communication system of the present invention includes a device for receiving, when the power is turned on, a control channel signal which is being transmitted at a certain interval by each of the other base stations in the system, a device for frame synchronizing each of the TDMA frames of the control channel signals which are received by the control channel signal receiving device, a device for extracting base station identification information of each of the other base stations from the TDMA frames which are frame synchronized by the TDMA frame synchronizing device, and a device for storing in a memory each of the base station identification information which is extracted by the base station identification information extracting device.

The base station of the radio communication system of the present invention further includes a device for determining a cycle of transmitting a superframe signal in accordance with the number of base stations using the control channel in the system, which is determined based upon the base station identification information stored in the memory.

The base station further includes a device for extracting information of a superframe signal transmission cycle of each of the other base stations from the synchronized TDMA frames, a device for determining a vacant time cycle for transmitting a superframe signal based upon the superframe signal transmission cycle information of each of the other base stations, which is extracted by the superframe signal transmission cycle information extracting device, and a device for transmitting the superframe signal based upon the vacant time cycle determined by the vacant time cycle determining device.

Further, the base station may include a device for determining whether transmission of a superframe signal is possible or not if the superframe signal is transmitted with the vacant time cycle which is determined by the vacant time cycle determining device and a device for stopping transmission of the superframe signal when the transmission of the superframe signal is determined to be impossible by the determining device.

Still further, the base station may include a device for indicating, when transmission of the superframe signal is stopped, that the superframe signal transmission has been stopped and a device for displaying a cause of the stoppage of the superframe signal transmission.

Furthermore, the base station may include a device for measuring electric field intensity of the control channel signal for each of the other base stations based upon the synchronized TDMA frames, a device for storing information of the electric field intensity of the control channel signal of each of the other base stations in the memory associating the electric field intensity information with the corresponding base station identification information, and a device for displaying the base station identification information and the electric field intensity information of each of the other base stations which are stored in the memory by the storing device.

Furthermore, the base station may include a device for displaying the superframe signal transmission cycle information of each of the other base stations, which is extracted by the superframe signal transmission cycle information extracting device, and the vacant time cycle in each of the superframe signal transmission cycles of the other base stations, and a device for designating a timing for transmitting a superframe signal based upon the vacant time cycle which is displayed by the displaying device.

In order to achieve the aforementioned first object, a radio terminal of the radio communication system according to the present invention includes a device for monitoring, when the power is turned on, a control channel signal and receiving a superframe signal which is being transmitted by each of the base stations in the system, a device for frame synchronizing each of TDMA frames of received superframe signals, a device for extracting base station identification information of each of the base stations from the synchronized superframe signals, a device for measuring electric field intensity of the control channel signal of each of the base stations based upon the synchronized superframe signals, a device for storing the electric field intensity information in a memory associating the electric field intensity information with the corresponding base station identification information, a device for displaying the base station identification information and the electric field intensity information which are stored in the memory by said storing device, a device for selecting a base station for connection based upon the electric field intensity information displayed by the displaying device, a device for connecting only to the base station selected by the base station selecting device and receiving a superframe signal therefrom, a device for monitoring electric field intensity of the control channel signal of the base station being connected, monitoring the control channel signal again when the electric field intensity of the control channel signal being received reaches a level below a predetermined level, receiving a superframe signal being transmitted by each of the other base stations, and updating the base station identification information and the electric field intensity information stored in the memory based upon the base station identification information and the electric field intensity information extracted from the received superframe signals, a device for displaying a message asking if the base station for connection to be changed, a device for changing the base station for connection, and a device for connecting to the base station having the control channel signal with a strongest electric field intensity, which is determined based upon the base station identification information and the electric field intensity information updated by the updating device, when the base station for connection is not changed by the base station changing device.

In order to achieve the above-mentioned second object of the present invention, the base station of the radio communication system of the present invention, when two control channel signals with different frequencies are provided in the system, further includes a device for receiving, when the power is turned on, one of the two control channel signals which is being transmitted at a certain interval by each of the other base stations in the system, a device for measuring a traffic of the control channel signal which is received, a device for receiving, when the traffic of the control channel signal which is received first reaches a predetermined level, the other control channel signal of the two control channel signals, a device for measuring a traffic of the second control channel signal, a device for comparing the traffics of the two control channel signals to determine which traffic of the two control channel signals is lighter, and a device for transmitting a superframe signal with the control channel signal having lighter traffic, of the two control channel signals.

Alternatively, the base station may include, when two control channel signals with different frequencies are provided in the system, a device for transmitting a superframe signal with one of the two control channel signals, a device for measuring a time for transmitting a superframe signal when the superframe signal transmission is started with one of the two control channel signals, a device for stopping the superframe signal transmission with the control channel signal when the superframe signal transmitting time reaches a predetermined period of time, a device for transmitting the superframe signal with the other control channel signal of the two control channel signals when the superframe signal transmission with the first control channel signal is stopped, a device for measuring a superframe signal transmitting time with the second control channel signal when the superframe signal transmission is started with the second control channel signal and stopping the superframe signal transmission when the superframe signal transmitting time with the second control channel signal reaches the predetermined period of time, a device for transmitting the superframe signal with the first control channel signal again when the superframe signal transmission with the second control channel signal is stopped.

Further alternatively, when two control channel signals are used in the system, the base station may include a device for stopping superframe signal transmission with one of the two control channel signals when a request for connection is received from a terminal station, and a device for transmitting the superframe signal, after stopping the superframe signal transmission with the first control channel signal, with the second control channel signal of the two control channel signals.

In order to achieve the aforementioned second object of the present invention, the terminal station of the radio communication system of the present invention, when two control channel signals with different frequencies are provided in the system, includes a device for monitoring one of the two control channel signals, a device for connecting, when a superframe signal is received from a base station with the control channel signal which is monitored, to the base station, a device for monitoring the other control channel signal of the two control channel signals when a superframe signal is not received in a predetermined of time from a base station with the control channel signal which is monitored first, a device for connecting, when a superframe signal is received from a base station with the other control channel signal of the two control channel signals, to the base station, and a device for monitoring the control channel signal which is monitored first again, when a superframe signal is not received with the other control channel signal, in the predetermined period of time, from a base station.

BRIEF DESCRIPTION OF THE DRAWINGS

A more complete appreciation of the present invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
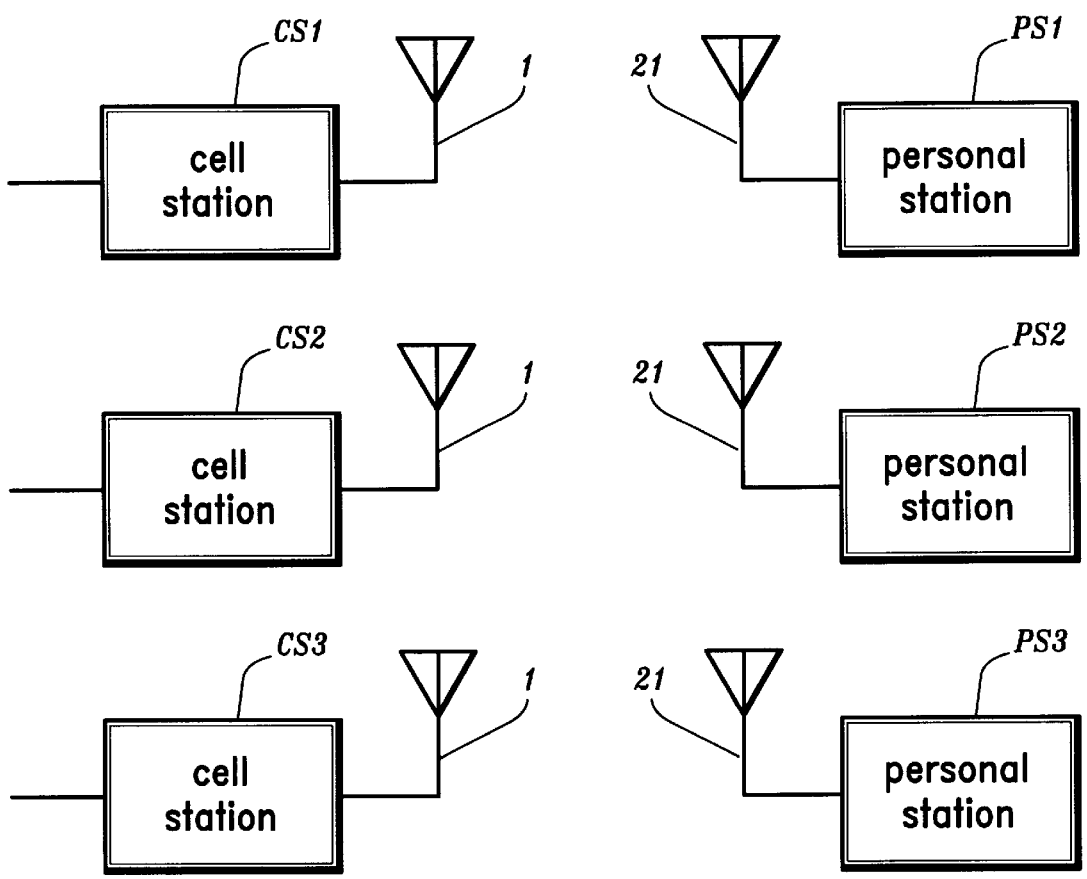
FIG. 1 is a schematic drawing illustrating an example of a structure of a radio communication system according to the present invention.

Referring now to the drawings, wherein like reference numerals designate identical or corresponding parts throughout the several views, embodiments of the present invention are explained hereinbelow.

FIG. 1 is a schematic drawing illustrating an example of a structure of a radio communication system according to the present invention.

The radio communication system shown in FIG. 1 employs a TDMA/TDD architecture, and includes a plurality of radio mobile terminals (personal station PS), which can be carried by individual users for communicating with a distant party while moving from one place to another, and a plurality of base stations (cell station CS), each of which is connected to a wire telephone network and is capable of communicating with a plurality of the radio terminals at one time over radio waves when the radio terminals are within a range of each of the base stations.

The radio communication system in this example includes three sub-systems, as shown in FIG. 1, a first sub-system including a cell station CS1 and a personal station PS1, a second sub-system including a cell station CS2 and a personal station PS2 and a third sub-system including a cell station CS3 and a personal station PS3.

Figure 2:
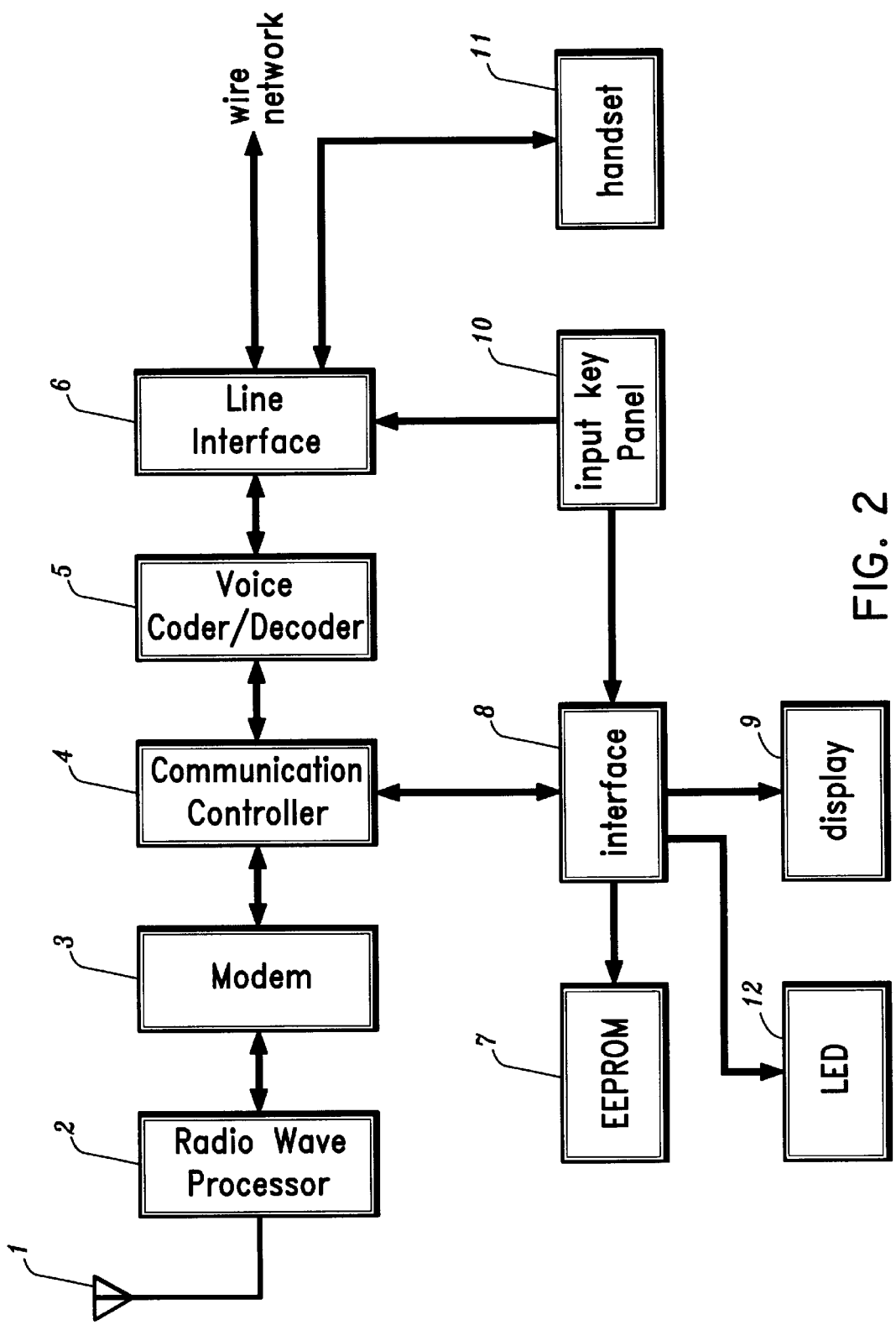
FIG. 2 is a block diagram illustrating an example of a cell station shown in FIG. 1.

FIG. 2 is a schematic drawing illustrating an example of a block diagram of the cell stations CS1, CS2 and CS3.

In FIG. 2, an antenna 1 receives radio signals which are transmitted from the other stations. A radio wave processor 2 processes the received signal. For example, processor 2 down-converts the received signal from 1.9 GHz to a lower frequency signal. A modem (modulator/demodulator) 3 demodulates the received signal and sends the demodulated signal to a communication controller 4. Communication controller 4 includes a CPU for performing various control operations, a ROM for storing various programs, such as, for example, a protocol for controlling communication and so forth. The controller 4 applies TDMA baseband processing to the received signal and sends the voice signal to a voice coder/decoder 5. The voice coder/decoder 5 converts the voice signal to an analogue voice signal, which is then sent out to a wire line (e.g. a wire network) via a line interface 6. The communication controller 4 also performs various processes of this invention.

The cell stations may optionally include a handset 11 with which a user talks with a destination party. The cell stations of this invention may further include an input key panel 10 for inputting various instructions and a display 9 which displays various information, such as, for example, communication traffic conditions and status of the cell stations, in accordance with instructions inputted by the user through the input key panel 10. The user manipulates the input key panel 10 for performing various inputting operations of the present invention, and via an interface 8 the display 9 displays various information according to such inputting operations.

The cell stations of this invention further include an EEPROM 7 as an example of a memory for storing therein various information according to the present invention and an alarm LED 12 which lights and extinguishes for indicating occurrence of various events according to the present invention.

Figure 3:
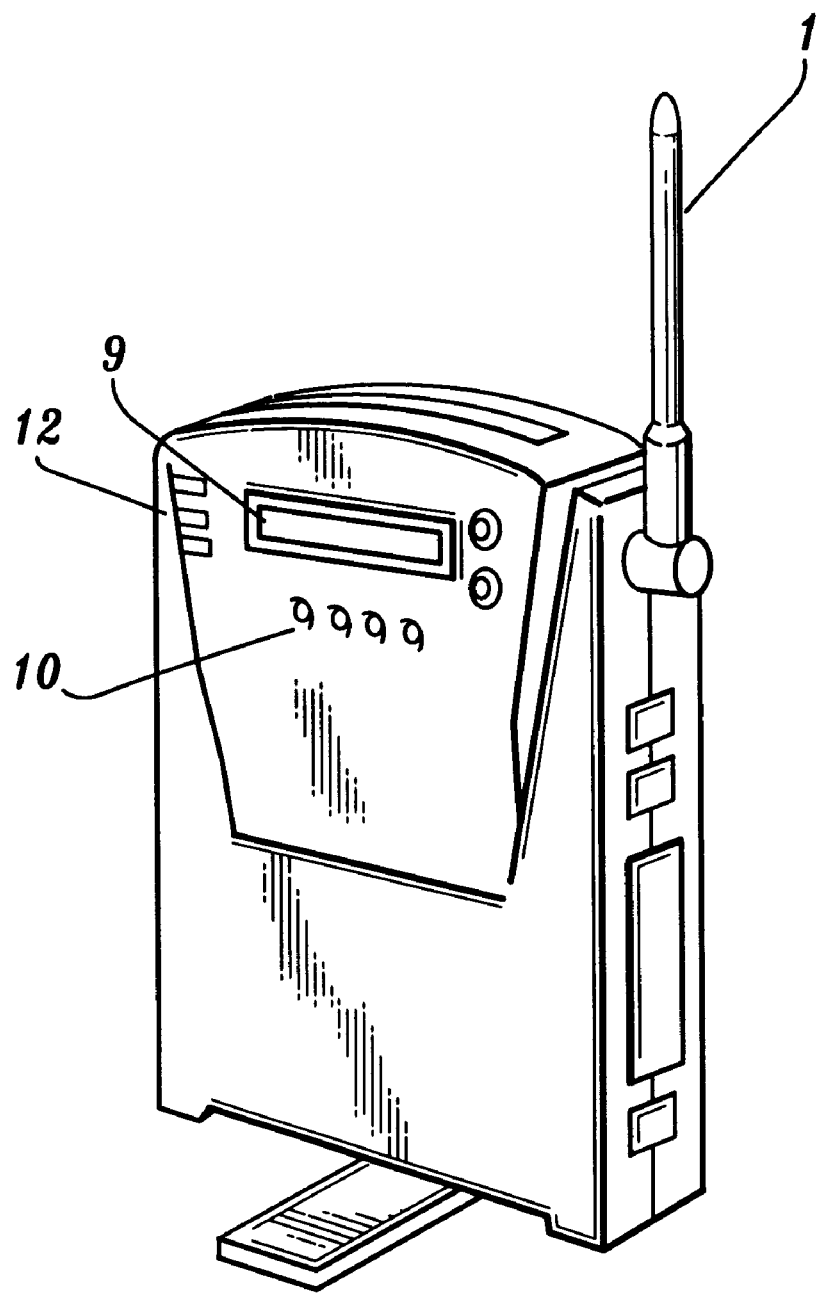
FIG. 3 is a schematic drawing illustrating an example of an exterior appearance of the cell station.

FIG. 3 is a schematic drawing illustrating an example of an exterior appearance of the cell stations.

Figure 4:
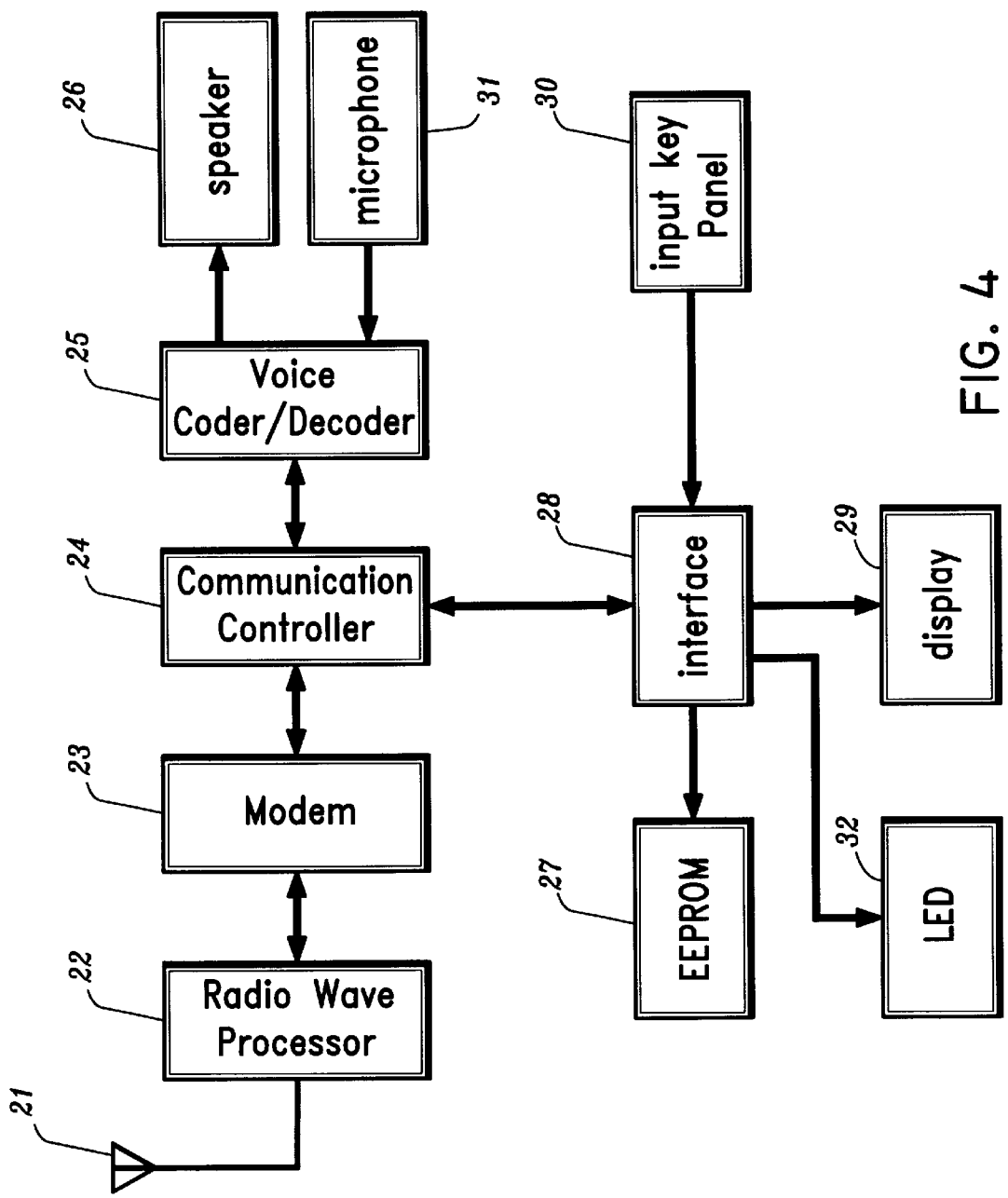
FIG. 4 is a block diagram illustrating an example of a personal station shown in FIG. 1.

FIG. 4 is a schematic drawing illustrating an example of a block diagram of the personal stations PS1, PS2, PS3 shown in FIG. 1.

Like the cell stations, an antenna 21 receives a radio signal which is transmitted from the other stations and a radio wave processor 22 processes the received signal. A modem (modulator/demodulator) 23 demodulates the received signal and sends the demodulated signal to a communication controller 24, which includes a CPU, a ROM and so forth. The communication controller 24 then applies TDMA baseband processing to the received signals and sends a voice signal to a voice coder/decoder 25. The voice coder/decoder 25 then converts the voice signal to an analogue voice signal which is sent out to a speaker 26 to be reproduced as voice. When transmitting a voice signal which is inputted through a microphone 31, the inputted analogue voice signal is processed in the same manner in the reverse order and a radio wave carrying the signal is transmitted by the antenna 21. The communication controller 24 performs various processes of this invention also.

The personal stations further include an input key panel 30 for inputting various instructions and a display 29 which displays various information, such as, for example, traffic conditions and communication status of the stations in accordance with the instructions inputted by the user through the input key panel 30. The user manipulates the input key panel 30 for performing various inputting operations of the present invention, and via an interface 28 the display 29 displays various information according to such inputting operations.

The personal stations further include an EEPROM 27 as an example of a memory for storing therein various information according to the present invention and an alarm LED 32 which lights and extinguishes for indicating occurrence of various events according to the present invention.

An exterior appearance of the personal stations PS1, PS2, PS3 is essentially the same as that of the cell stations, and therefore the drawing is omitted.

Next, mapping of logical control channels on a TDMA frame in each of the cell stations CS1, CS2, CS3 is explained.

Figure 5:
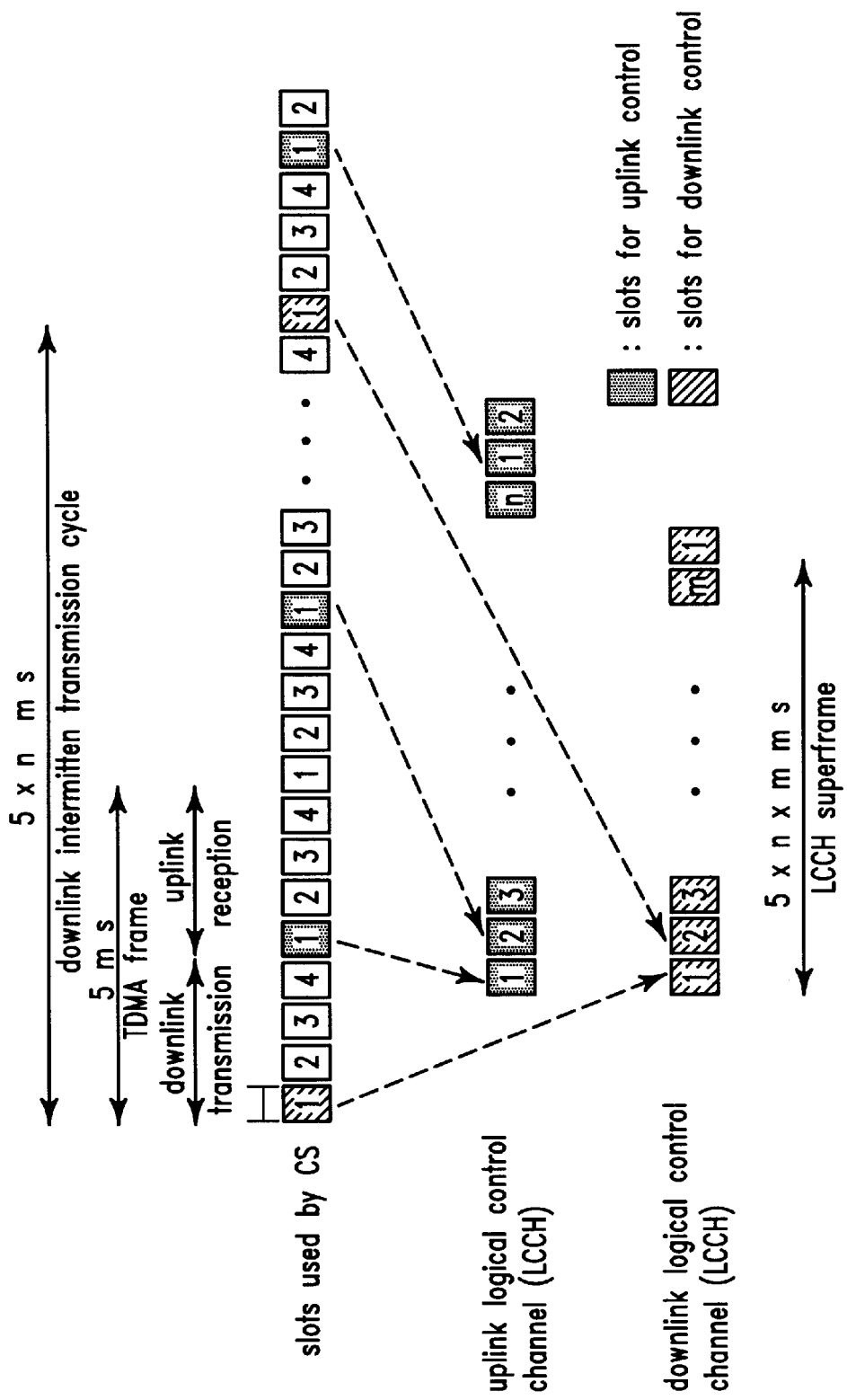
FIG. 5 is a diagram illustrating an example of a structure of slots and logical control channels used by the cell station and explaining mapping of logical control channels on a TDMA frame.

FIG. 5 is a diagram illustrating an example of a structure of slots and logical control channels used by each of the cell stations CS1, CS2, CS3.

Like a digital cordless telephone system employing a TDMA/TDD architecture, such as the PHS system, a digital signal carried by a radio wave which is radiated by each of the cell stations CS1, CS2, CS3 and the personal stations PS1, PS2, PS3 is divided into 5 ms time segments, each referred to as a TDMA frame.

Each frame is further divided into 8 time slots, and therefore the time for each slot is 625 $\mu$s. Of the 8 slots, four slots each are assigned for downlink (transmission from a cell station to a personal station) channels and uplink (transmission from a personal station to a cell station) channels, respectively.

In this example, the first slot of each four slots is assigned as a control channel for setting function channels for transmitting control information necessary for controlling the connection between the cell station and the personal station, for example, a broadcast control channel (BCCH) for broadcasting control information. The other three slots each are assigned for communication channels.

The cell station broadcasts to all personal stations, using the broadcast control channel (BCCH), control information related to a channel structure and system information such as information regarding which slots are available for transmitting control information for obtaining a communication slot. A personal station receives such information and transmits information for informing its current location to the system, which is necessary for receiving a call addressed to the personal station.

Like the PHS system, there are provided three communication protocol phases in this example, a phase for establishing the radio interface handshake, which is called a link channel establishment phase, a phase for connecting a call between the cell station and the personal station which established the handshake, which is called a service channel establishment phase and a phase for performing communication and data transmission, which is called a communication phase.

The link channel establishment phase is defined as the stage of using control channel functions to select a channel (link channel) with the quality and capacity required for each call connection.

A control channel used in the link establishment phase is called a logical control channel (LCCH). As downlink logical control channel (LCCH) elements, there are a broadcast control channel (BCCH), a paging channel (PCH) which is a one-way point-multipoint channel that simultaneously transmits identical information to individual cell stations and a signaling control channel (SCCH) which is a bi-directional point-point channel that transmits information needed for call connection between the cell station and a personal station.

Each of the cell stations CS1, CS2, CS3 intermittently transmits a control channel signal which indicates a structure of the logical control channel (LCCH) transmitted by the cell station and the positions of the control channel slot with which transmission is possible for each of the personal stations PS1, PS2, PS3 by the broadcasting message.

Like the PHS system, an LCCH superframe, which is the minimum cycle of the downlink logical control channel (LCCH) slots specifying the slot position of all LCCH elements, is constructed of control channel signals which are intermittently transmitted.

An example of the LCCH superframe shown in FIG. 5 is constructed of "m" number of LCCH slots (superframe signals) which are intermittently transmitted each cycle of "n" number of TDMA frames. In other words, the value "n" shows the cycle at which the cell station intermittently transmits an LCCH slot and is expressed by the number of TDMA frames within the intermittent transmission cycle. An "m" number of these intermittent transmission cycles form an LCCH superframe. An intermittent transmission cycle of a downlink LCCH slot is hereinafter called a superframe signal transmission cycle.

Figure 6:
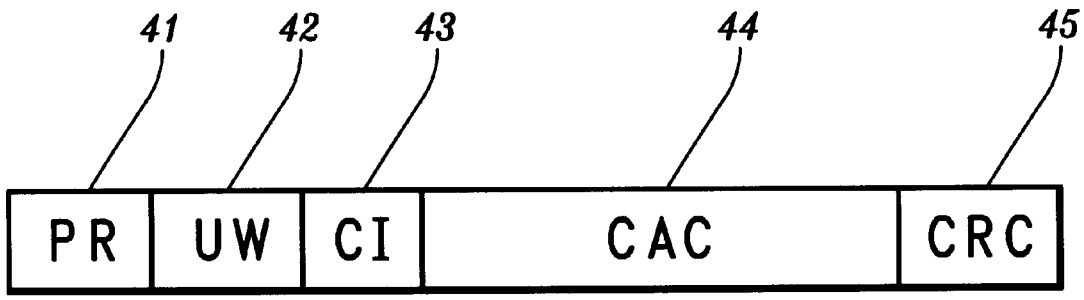
FIG. 6 is a diagram illustrating an example of a structure of a control channel signal of a superframe signal.

FIG. 6 is a diagram illustrating an example of a structure of a control channel signal forming a superframe signal. As shown in FIG. 6, the control channel signal of the superframe signal includes a preamble (PR) 41, a unique word (UW) 42, a channel identification (CI) 43, control data (CAC) 44 and error correction parity (CRC) 45. The control data (CAC) 44 includes superframe signal transmission cycle information and cell station identification information (CS-ID) of each cell station.

Figure 7:
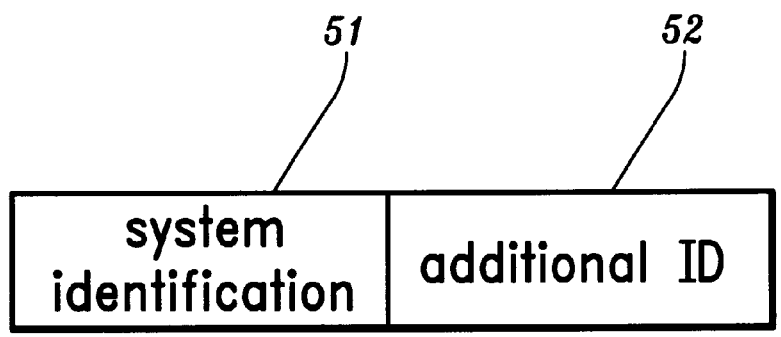
FIG. 7 is a diagram illustrating an example of a structure of cell station identification information which is included in the control channel signal of the superframe signal.

FIG. 7 is an example of a diagram illustrating a structure of the cell station identification information (CS-ID), which includes system identification information 51 consisting of 29 bits and additional identification information 52 consisting of 13 bits.

Next, a process performed by each of the cell stations CS1, CS2, CS3 for monitoring the control channel signals and extracting the cell station identification information (CS-ID) from each of the received signals and for storing the information in a memory is explained.

Figure 8:
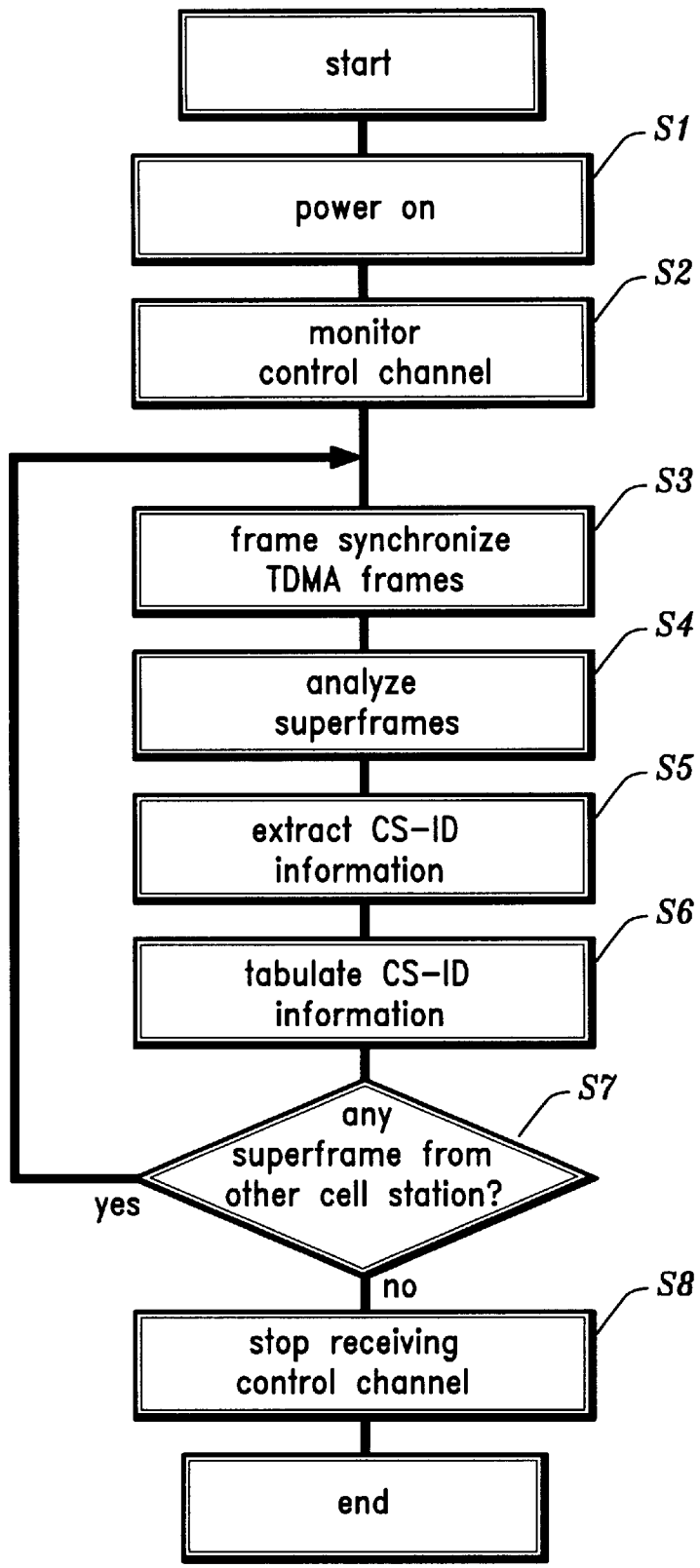
FIG. 8 is a flowchart illustrating an example of a process performed by the cell station for monitoring a control channel signal and extracting cell station identification information (CS-ID) from each of the received signals and for storing the information in a memory.

FIG. 8 is a flowchart illustrating an example of the above-mentioned process. The process is performed by the communication controller 4 of each the cell stations CS1, CS2, CS3.

In the process, when the power of the cell station CS3, for example, is turned on in step S1, step S2 starts receiving, via the antenna 1, a control channel signal and receives a superframe signal being transmitted from each of the other cell stations CS1, CS2. Step S3 frame synchronizes each of the received TDMA frames using the unique word 42 contained in the broadcast control channel (BCCH) in each of the received superframe signals, and step S4 analyzes each of the received superframe signals to identify the control data (CAC) 44 in each of the received superframe signals. Then, step S5 extracts cell station identification information (CS-ID) from each of the control data (CAC) 44. Step S6 then tabulates the extracted cell station identification information (CS-ID) and stores the tabulated information in the EEPROM 7.

Then, step S7 checks if a superframe signal is being transmitted from any of the other cell stations, and if the answer to the step S7 is YES, steps S3–S6 are repeated. When there are no superframe signals being transmitted from any of the other cell stations, the process proceeds to step S8 to stop receiving the control channel signals and end the process.

The cell station CS3 repeats the above-described process intermittently when the power is on and updates the information stored in the EEPROM 7 each time the process is performed. The cell stations CS1 and CS2 also perform the same process likewise.

Thus, each of the cell stations CS1, CS2, CS3, when the power is on, automatically receive the cell station identification information (CS-ID) from each of the other cell stations and store the information in memory.

Described next is a process to be performed by each of the cell stations CS1, CS2, CS3 for determining the superframe signal transmission cycle in accordance with the number of cell stations using the control channel signal in the system, which is determined based upon the cell station identification information (CS-ID) stored in the EEPROM 7.

Figure 9:
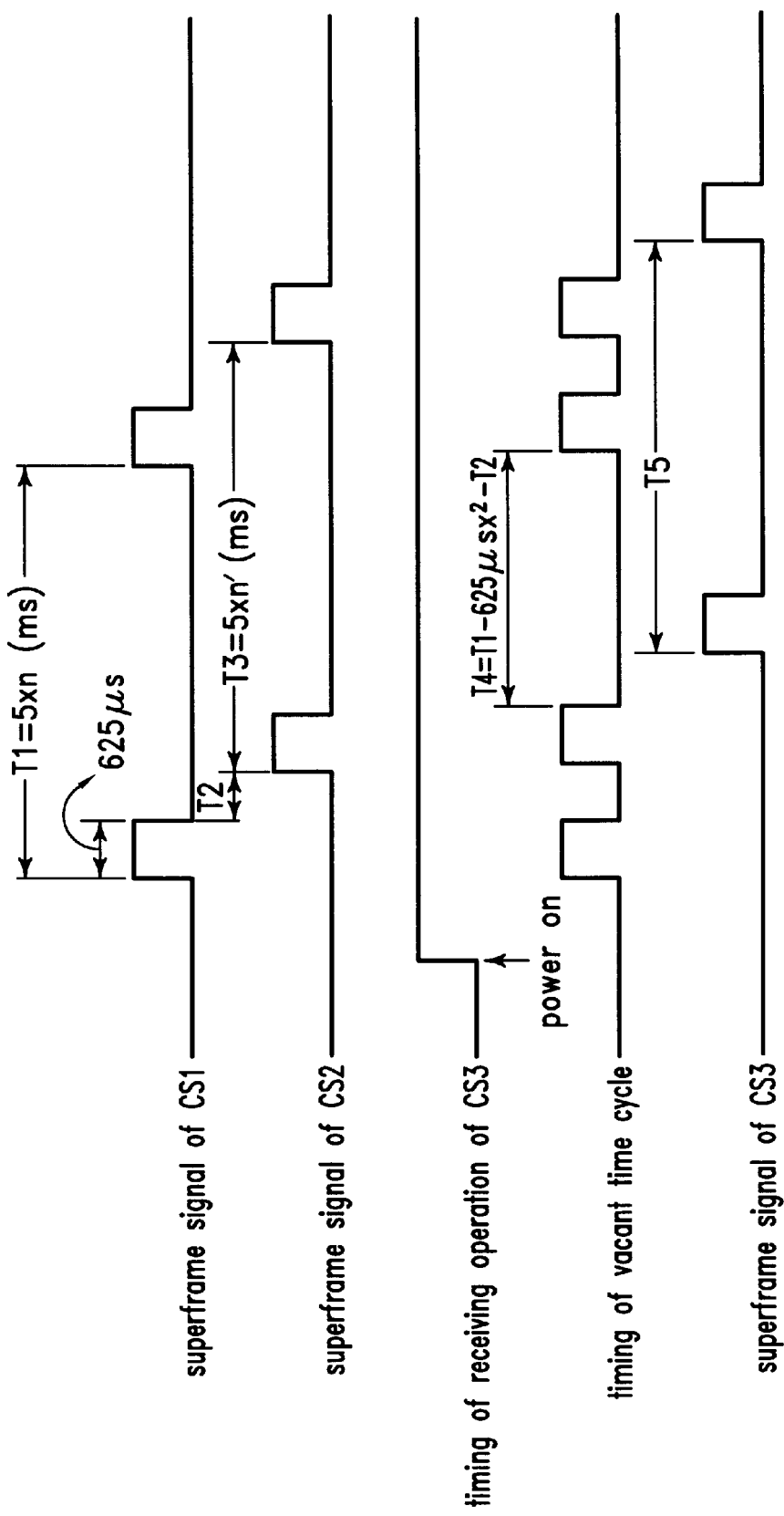
FIG. 9 is a timing chart illustrating an example of a superframe signal transmission cycle of the cell station.

FIG. 9 is a timing chart illustrating an example of the superframe signal transmission cycle of each of the cell stations CS1, CS2, CS3. In the PHS system, it is specified that 8 slots or less are transmitted per second on one control carrier wave. Therefore, a superframe signal transmission cycle is required to be longer than 125 ms at the minimum.

Figure 10:
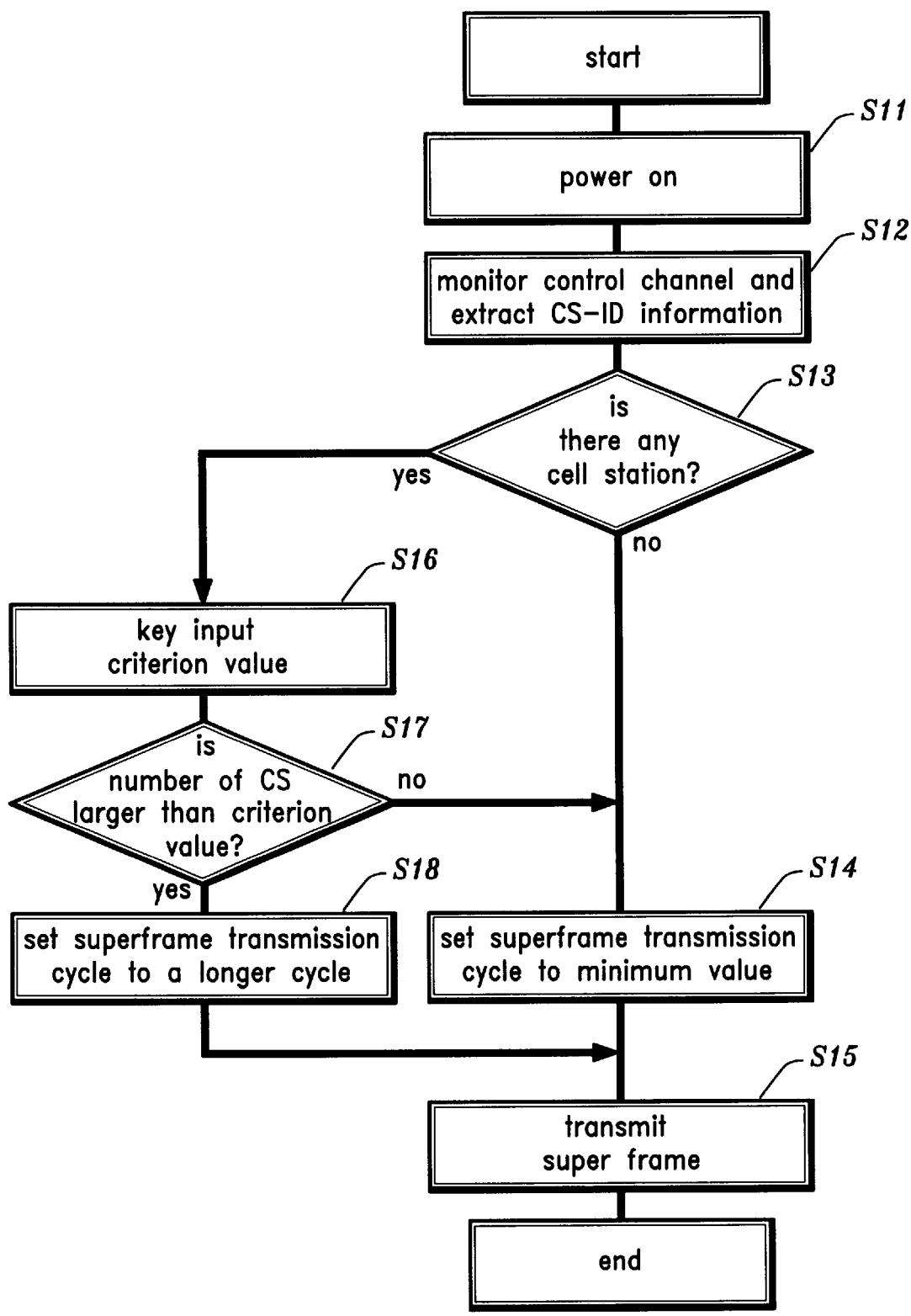
FIG. 10 is a flowchart illustrating an example of a process performed by the cell station to determine the superframe signal transmission cycle.

FIG. 10 is a flowchart illustrating a process performed by the cell stations CS1, CS2, CS3 for determining the superframe signal transmission cycle. The process is performed by the communication controller 4 of the cell stations CS1, CS2, CS3.

After the power to the cell station CS1, for example, is turned on in step S1, step S12 performs a process for monitoring for control channel signals and extracting the. cell station identification information (CS-ID) from the received signals and for storing the information in the EEPROM 7, which corresponds to the process of steps S2–S8 of the flowchart shown in FIG. 8. Then, step S13 checks if any cell station is registered in the information stored in the EEPROM 7 and if the answer to the step S13 is NO, step S14 sets the superframe signal transmission cycle to the minimum value of 125 ms. Step S15 then transmits a superframe signal using the 125 ms minimum transmission cycle and the process ends.

If the answer to step S13 is YES, step S16 inputs a criterion value for the number of cell stations, which is inputted through the input key panel 10 of the cell station CS1 by the user. For example, the inputted criterion value is based on the number of cell stations located in an area of cell station CS1. Step S17 compares the number of cell stations registered in the EEPROM 7 with the inputted criterion value. If the number of registered cell stations is larger than the inputted criterion value, the process proceeds to step S18 to set the superframe transmission cycle to a longer cycle, which is prescribed beforehand in the EEPROM 7. Then, step S15 transmits the superframe signal with the longer cycle and ends the process.

A plurality of predetermined superframe transmission cycle values may be prestored in the EEPROM 7, so that one of the values is selected in accordance with the difference between the number of the cell stations registered in the EEPROM 7 and the inputted criterion value. For example, if the difference is 1, a cycle of 200 ms may be selected, if the difference is 2, a cycle of 300 ms may be selected and if the difference is more than 3, a cycle of 500 ms may be selected. Then, the communication controller 4 sets the superframe signal transmission cycle to the selected cycle and transmits the superframe signal with the selected cycle.

If the number of cell stations registered in the information stored in EEPROM 7 is smaller than the criterion value, step S14 sets the cycle to the minimum value of 125 ms and ends the process after transmitting the superframe signal with the minimum cycle of 125 ms.

Further, the superframe signal transmission cycle may be determined based upon the number of registered cell stations. For example, information specifying a superframe signal transmission cycle for each predetermined number of registered cell stations, such as, for example, 125 ms if the number of cell stations is within 1–3, 200 ms if the number of cell stations is 5 and 500 ms if the number of cell stations is more than 5, is stored in the EEPROM 7. Depending upon the number of cell stations registered in the EEPROM 7 the cycle is automatically determined.

Figure 11:
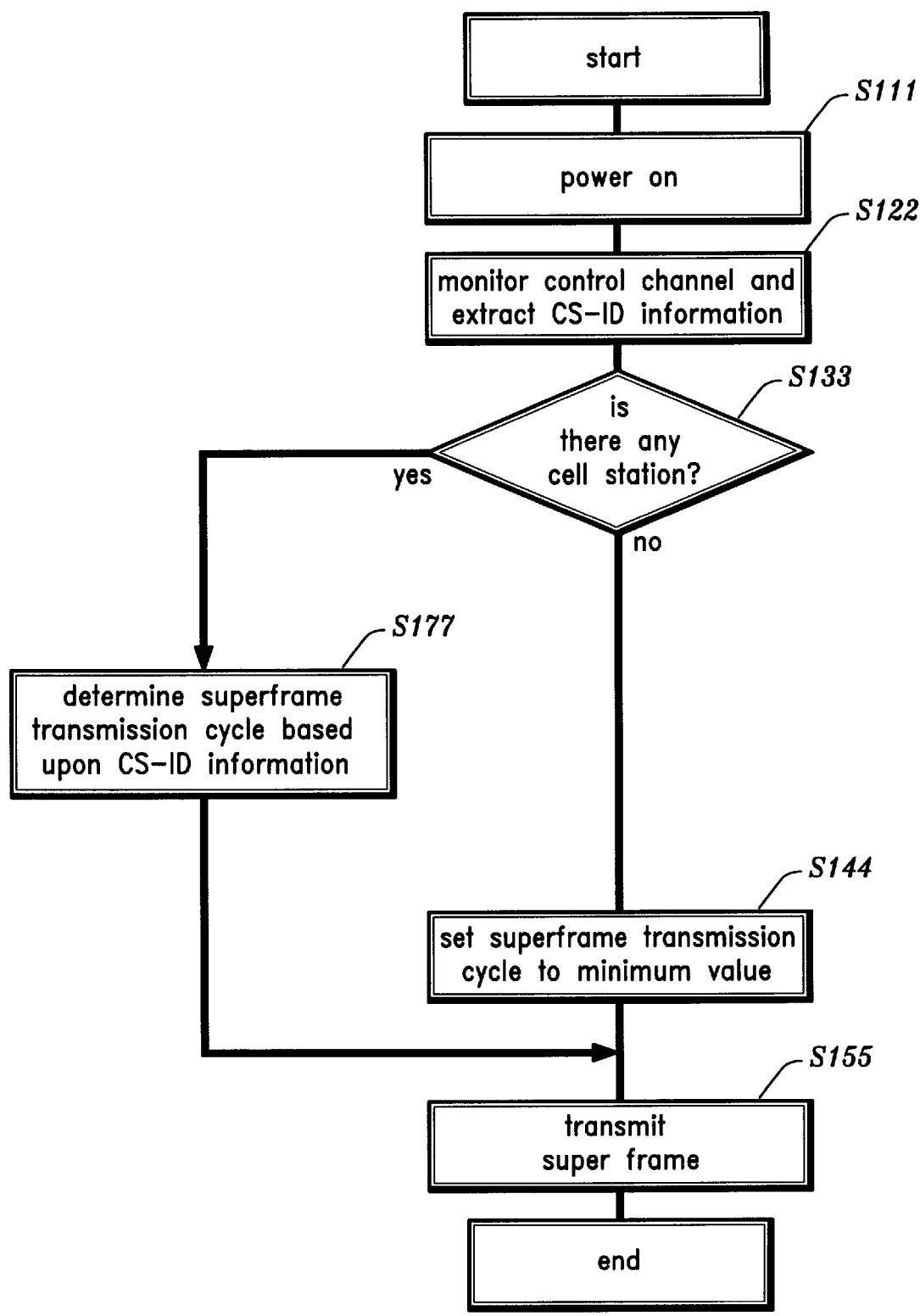
FIG. 11 is a flowchart illustrating an example of a process performed by the cell station to determine the superframe signal transmission cycle based upon the number of cell stations transmitting a superframe signal in the system.

FIG. 11 is a flowchart illustrating an example of a process for determining the superframe signal transmission cycle based upon the number of cell stations. Step S122 is similar to step S12 in FIG. 10. Step S133 checks if any cell stations are registered in the EEPROM 7. If yes, step S177 then determines the superframe signal transmission cycle in accordance with the number of cell stations, based upon the information stored in the EEPROM 7 as described above.

Thus, the cell station CS3 determines the superframe signal transmission cycle depending upon the number of cell stations using the control channel signal. In other words, depending on the traffic of the control channel signals in the system. Likewise, the other cell stations CS1, CS2 also determine their superframe signal transmission cycle depending on the traffic of the control channel signals in the system.

Each of the cell stations CS1, CS2, CS3, therefore, when the traffic of the control channel signals becomes busy, can prevent its own superframe signal from interfering with the superframe signal from the other cell stations by setting the superframe signal transmission cycle to a longer cycle.

Figure 12:
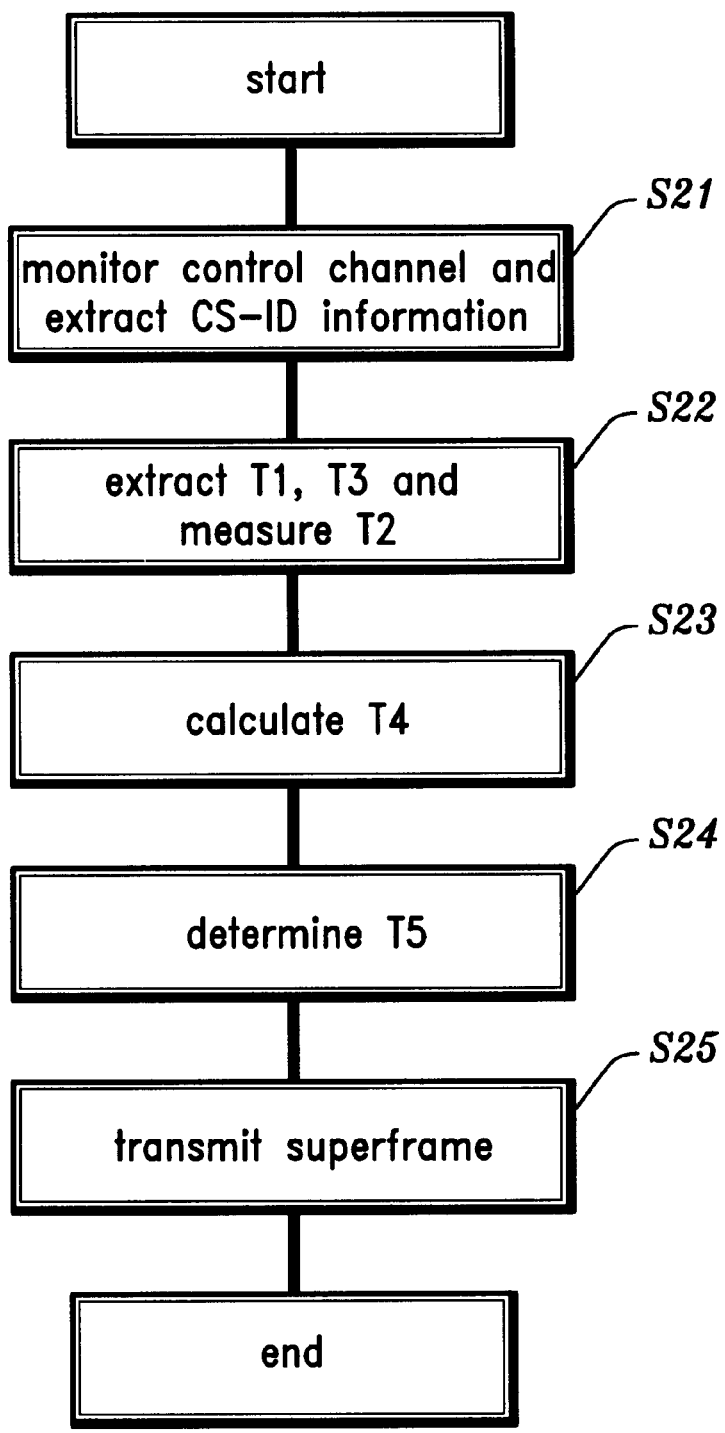
FIG. 12 is a flowchart illustrating an example of a process performed by the cell station to determine a superframe signal transmission cycle based upon the vacant time in the superframe signal transmission cycle of each of the other cell stations.

Next, a process of the cell stations CS1, CS2, CS3 for determining the superframe signal transmission cycle based upon the vacant time in the superframe signal transmission cycle of each of the other cell stations is explained by referring to FIG. 12, which is a flowchart illustrating an example of the above-mentioned process. The explanation will also be made by further reference to FIG. 9. The process is performed by the communication controller 4 in each of the cell stations CS1, CS2, CS3.

In the process, when the power to the cell station CS3, for example, is turned on, step S21 performs the process of monitoring the control channel signal and extracting the cell station identification information (CS-ID) from each of the received signals for storing the information in the EEPROM 7, which corresponds to the process performed by steps S2–S8 shown in FIG. 8.

Step S22 extracts the superframe signal transmission cycle information T1 of the cell station CS1 and the superframe signal transmission cycle information T3 of the cell station CS2, each from the control data (CAC) 44 in the received superframe signals. Step S22 then determines a time T2, which is a time from the time when the cell station CS1 has finished transmitting its superframe signal to the time when the cell station CS2 begins transmitting its superframe signal.

The time T2 may be determined by subtracting 625 As from a time, which is obtained, for example, by starting a timer when the unique word (UW) of the first control channel signal from the cell station CS1 is detected and stopping the timer when the unique word (UW) of the control channel signal from the cell station CS2 is detected.

Then, step S23 calculates the vacant time cycle T4, which is a period of time in which a superframe signal is not transmitted by either cell station CS1 or cell station CS2, based upon the above-mentioned information T1 and T2.

Now, in more detail by reference to FIG. 9, the superframe transmission cycle T1 of the cell station CS1 is defined as 5×n (ms), and the superframe signal transmission cycle T3 of the cell station CS2 is defined as 5×n' (ms), respectively, as examples in this embodiment. The time T2 from the end of the superframe signal transmission of the cell station CS1 and the start of the superframe signal transmission of the cell station CS2 is determined as described above by use of a timer. The vacant time cycle T4 in each of the superframe signal transmission cycles of the cell station CS1 and CS2, which is available for the cell station CS3 to transmit the superframe signal, is calculated as T4=T1−(625 $\mu$s×2)−T2.

Figure 13:
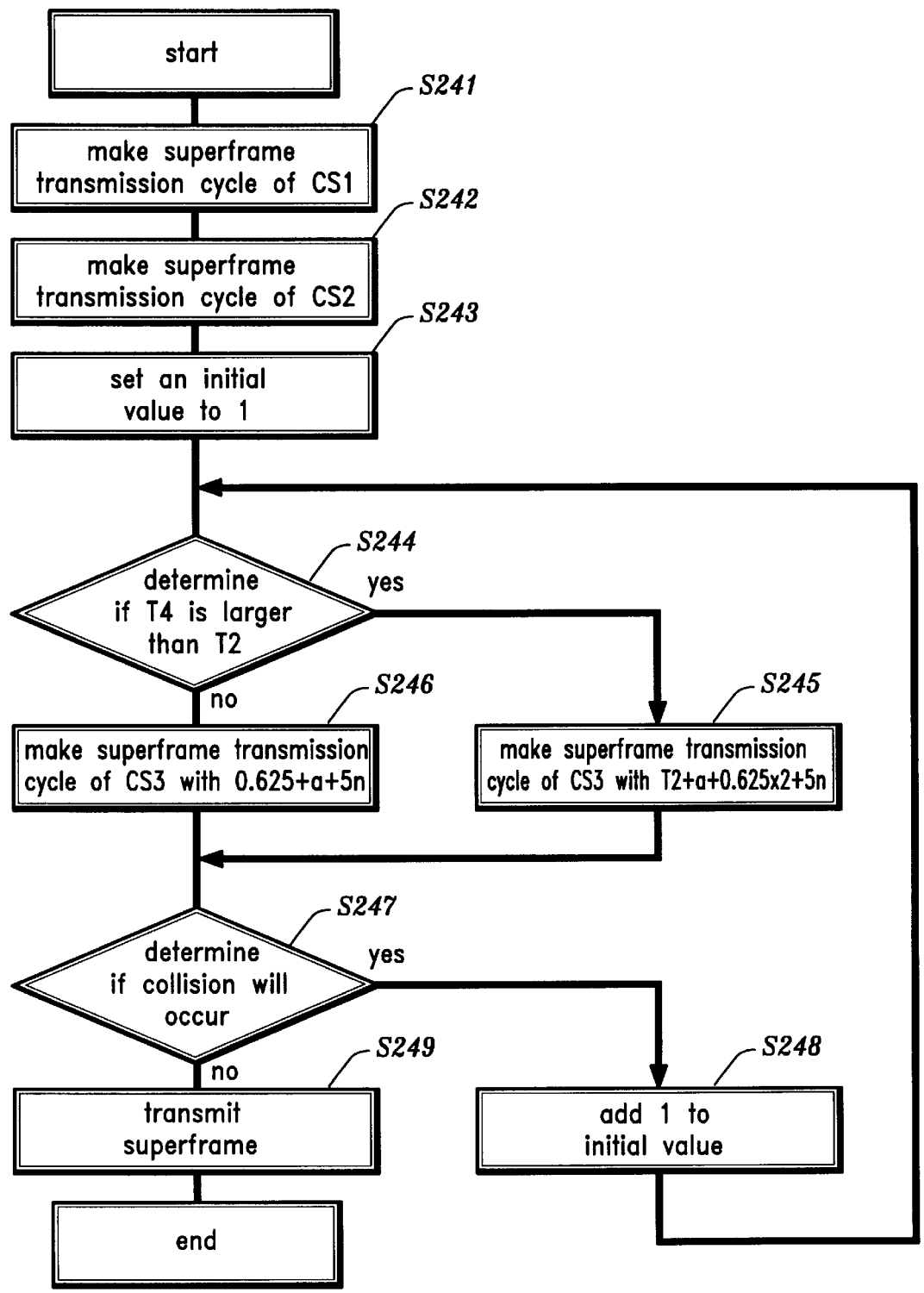
FIG. 13 is a flowchart illustrating an example of a process for determining whether or not the superframe signal will collide with the superframe signal being transmitted by the other cell stations if the superframe signal is transmitted with the superframe signal transmission cycle which is determined based upon the vacant time cycle in each of the superframe signal transmission cycles of the other cell stations.

Step S24 then determines the superframe signal transmission cycle T5 of the cell station CS3 based upon the vacant time cycle T4 using a process as illustrated in FIG. 13, which will be explained next. The cell station CS3 transmits the superframe signal in accordance with the superframe signal transmission cycle T5 in step S25 and the process ends.

FIG. 13 is a flowchart illustrating an example of a process for determining the superframe signal transmitting cycle based upon the vacant time cycle in each of the superframe signal transmission cycles of the other cell stations.

In FIG. 13, step S241 makes a list of start timings of the superframe signal transmission cycles of the cell station CS1 based upon the superframe signal transmission cycle information T1 of the cell station CS1, and step S242 makes a list of start timings of the superframe signal transmission cycles of the cell station CS2 based upon the superframe signal transmission cycle information T3 of the cell station CS2. Because the superframe signal transmission cycle T1 of the cell station CS1 is expressed as T1=5×"n" (ms), as shown in FIG. 9, each start timing of the superframe signal transmission cycle T1 of the cell station CS1 is calculated by changing the value "n" in the equation 5×"n" (ms), for example, from 1 to 100. Likewise, because the cell station CS2 transmits its superframe signal a time T2 after the transmission of the superframe signal transmitted by cell station CS1 as shown in FIG. 9, each start timing of the superframe signal transmission cycle T3 of the cell station CS2 is obtained by changing the value "n" in the equation (T2+625 $\mu$s)+5×"n" (ms), for example, from 1 to 100.

Then, step S243 sets a value of the time "a", which is a period of time after the transmission of the superframe signals by the other cell stations that cell station CS3 would begin transmitting its superframe signal, to an initial value of 1 (ms).

Step S244 then determines if the vacant time cycle T4, which is a period of time in which a superframe signal is not transmitted by either cell station CS1 or cell station CS2, is longer than the time T2.

If T4 is longer than T2 in step S244, step S245 determines that transmission of the superframe signal of the cell station CS3 starts during the time T4 and makes a list of start timings of the superframe signal transmission cycle T5 of the cell station CS3 by changing the value "n" from 1 to 100, for example, in the equation (T2+"a"+625 $\mu$s×2)+5×"n" (ms), ("a" being set to 1 (ms) as the initial value). If the vacant time cycle T4 is less than the time T2, step S246 determines that the superframe signal transmission of the cell station CS3 starts during the time T2, and makes a list of start timings of the superframe signal transmission cycle T5 of the cell station CS3 by changing the value "n" from 1 to 100 in the equation 625 $\mu$s+"a"+5×"n" (ms), "a" being set to 1 (ms) as the initial value.

Then, step S247 checks if any start timing of the superframe signal transmission cycle T5 will collide with any start timing of the superframe signal transmission cycles T1 and T3. If, for example, the start timing of any cycle is within 1 ms of the start timing of any other cycle, it is determined that a collision will occur.

If step S247 determines that collision will occur, step S248 changes the value of "a", for example, to 2 (ms) by adding one to the initial value of 1(ms), and the process returns to step S244.

If step S247 determines that collision will not occur, step S249 sets the superframe signal transmission cycle, which has been determined as not causing a collision, as the superframe signal transmission cycle of the cell station CS3 and transmits the superframe signal with the transmission cycle as determined.

Thus, even when a plurality of cell stations, for example, cell stations CS1, CS2 as described above, are transmitting the superframe signal, the cell station CS3 can transmit the superframe signal without causing interference with the superframe signal from the other cell stations CS1, CS2 by determining the superframe signal transmission cycle based upon the vacant time in the superframe signal transmission cycles of each of the other cell stations CS1, CS2.

Although the above process is explained for the case of the cell station CS3, the other cell stations CS1, CS2 perform the same process likewise.

Next, another example of a process for determining the superframe signal transmission cycle based upon the vacant time cycle in each of the superframe signal transmission cycles of the other cell stations is explained.

In this example, each of the cell stations CS1, CS2, CS3 determines whether or not transmission of the superframe signal is possible with the transmission cycles as determined based upon the vacant times cycle which is determined based upon the information of the superframe signal transmission cycle of each of the other cell stations. If it is determined that transmission is not possible the transmission of the superframe signal is discontinued and a message informing the user that the transmission has been discontinued is displayed.

Figure 14:
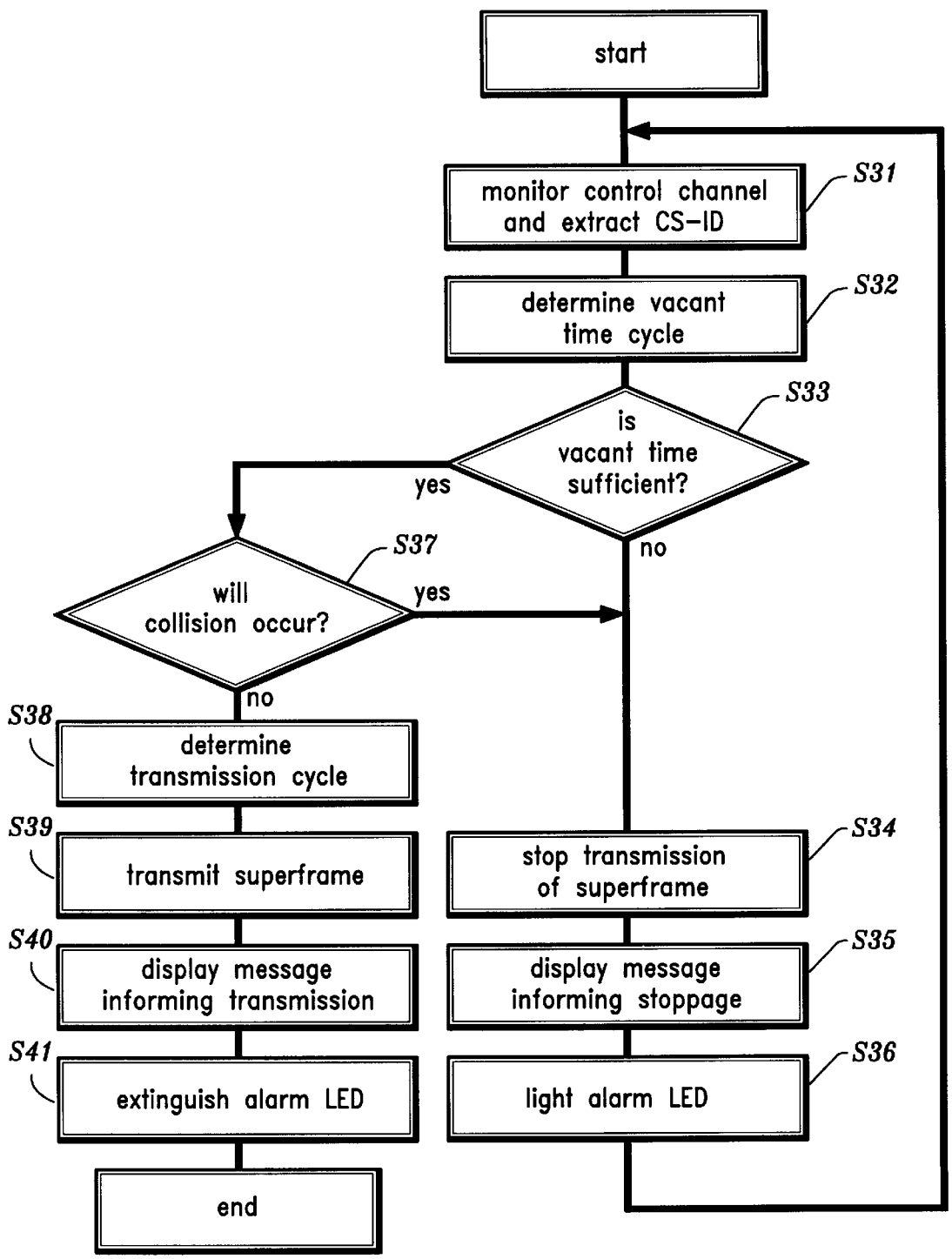
FIG. 14 is a flowchart illustrating another example of the process for determining the superframe signal transmission cycle based upon the vacant time cycle in each of the superframe signal transmission cycles of the other cell stations.

FIG. 14 is a flowchart illustrating an example of the above-mentioned process, which is performed by the communication controller 4 of each of the cell stations CS1, CS2, CS3.

When the power to the cell station CS1, for example, is turned on, step S31 performs the process of monitoring the control channel signal and extracting the cell station identification information (CS-ID) from the received signal for storing the information in the EEPROM 7, which corresponds to steps S2–S8 shown in FIG. 8.

Step S32 performs the process of determining the vacant time cycle, which corresponds to steps S22–S23 of FIG. 12. Step S33 then determines if the vacant time cycle is longer than a predetermined period of time, for example, 1 ms, which is necessary at the minimum for transmitting one slot of 625 $\mu$s. If the answer to step S33 is NO, the process proceeds to step S34 to discontinue transmission of the superframe signal. Step S35 then displays in display 9 a message informing the user of the discontinuance of the transmission and a cause of the discontinuance and step S36 lights the alarm LED 12 to indicate the discontinuance of the transmission to the user.

If it is determined that there is a sufficient vacant time cycle in step S33, then step S37 checks whether or not the superframe signal will collide with any of the other superframe signals being transmitted by the other cell stations if the superframe signal is transmitted during the vacant time cycle as determined. If it is determined that collision will occur in step S37, the process proceeds to step S34 to discontinue transmission of the superframe signal. Step S35 then displays a message informing the user of the discontinuance of the transmission and the cause of the discontinuance in the display 9 and step S36 lights the alarm LED 12 to indicate the discontinuance of the transmission to the user.

If it is determined that a collision will not occur in step S37, the process proceeds to step S38 to determine the superframe signal transmission cycle based upon the vacant time cycle, and step S39 transmits the superframe signal with the cycle as determined. Step S40 then displays in the display 9 a message informing the user that the superframe signal is being transmitted and step S41 extinguishes the alarm LED 12 (if on) to inform the user that the superframe signal is being transmitted without trouble.

Whether or not the superframe signal will collide with any of the other superframe signals being transmitted by the other cell stations if the superframe signal is transmitted during the determined vacant time cycle, is determined by the process which is explained above by reference to FIG. 13.

Even when the transmission of the superframe signal is discontinued due to the traffic conditions, when the other cell stations discontinue the transmission of the superframe signal or change the superframe signal transmission cycle and the transmission of the superframe signal during the vacant time cycle becomes possible, the display 9 displays a message informing the user that the superframe signal transmission is now possible and the alarm LED 12 is extinguished.

Thus, when a plurality of cell stations, for example CS1, CS2, are transmitting the superframe signal respectively as explained above, the cell station CS3 performs the above-mentioned process, so that collision of the superframe signals is avoided.

Further, because each of the cell stations displays a message informing of discontinuance of transmission of the superframe signal and a message informing of the cause of the discontinuance, the user can recognize that the cell station is not broken and is working properly. Further, the user can identify the cause of the discontinuance and, for example, can re-arrange the positions of the cell stations if the discontinuance is due to the traffic conditions of the control signals in the system.

Next, another example of a process for monitoring the control channel signal and extracting the cell station identification information (CS-ID) from each of the received signals for storing the information in memory is explained.

In this example, each of the cell stations measures the electric field intensity of the control signal of each of the other cell stations based upon the TDMA frames received from each of the other cell stations. The information of the electric field intensity of the control signal of each cell station is stored in the EEPROM 7 corresponding to the cell station identification information (CS-ID) of each cell station.

Figure 15:
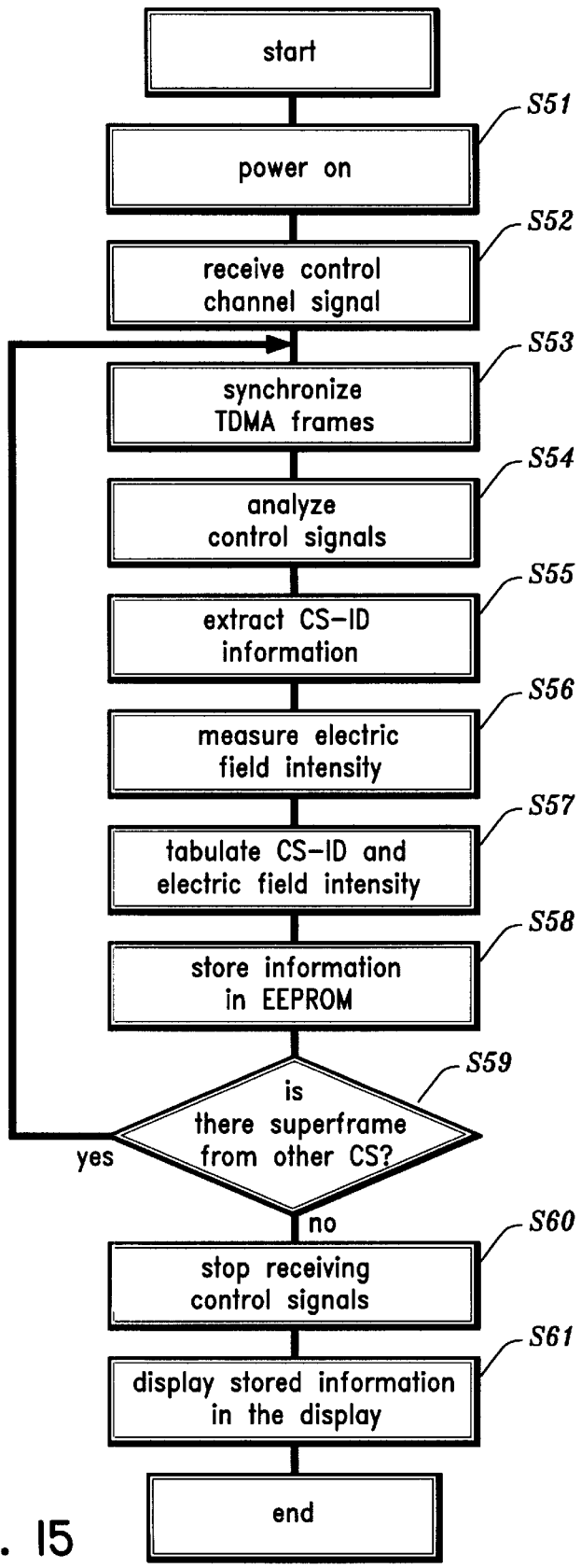
FIG. 15 is a flowchart illustrating another example of the process performed by the cell station to monitor the control channel signal and extract the cell station identification information (CS-ID) from each of the received signals for storing the information in the memory.

FIG. 15 is a flowchart illustrating an example of the above-mentioned process. The process is performed by the communication controller 4 of each of the cell stations, CS1, CS2, CS3.

In the process, when the power of the cell station CS1, for example, is turned on in step S51, step S52 starts receiving the control channel signals and receives a superframe signal being transmitted by each of the other cell stations CS2, CS3. Step S53 frame synchronizes each of the received frames.

Step S54 then analyzes each of the received control signals and step S55 extracts the cell station identification information (CS-ID) from the control data 44 contained in each of the control signals. Then, step S56 measures the electric field intensity of the control signal received from the cell station which corresponds to the extracted cell station identification information (CS-ID). Various methods of measuring electric field intensity are known in the art and may be used by the present invention. Step S57 then tabulates the information of the electric field intensity of the control signal and the corresponding cell station identification information (CS-ID) of each of the cell stations, and step S58 stores the tabulated information in the EEPROM 7.

The process then proceeds to step S59 to check if there is any superframe signal being transmitted from the other cell stations. If the answer to step S59 is YES, steps S53–S58 are repeated, and the information of the cell station identification (CS-ID) and the electric field intensity of the control signal of each of the cell stations, which is stored in the EEPROM 7, is updated. If there is no superframe signal being received from another cell station, the process proceeds to step S60 to discontinue receiving the control channel signal. Step S61 displays the tabulated information of the cell station identification (CS-ID) and the electric field intensity of the control signal of each cell station in the display 9 and ends the process.

Each of the cell stations CS1, CS2, CS3, when the power is on, periodically performs the above-mentioned process and updates the information of the cell station identification (CS-ID) and the electric field intensity of the control signal of each cell station, which is stored in the EEPROM 7. Further, the stored information is displayed in the display 9.

The user therefore can confirm, with each of the cell stations, the radio wave conditions surrounding each of the cell stations based upon the information of the electric field intensity of the control signals of the other cell stations, which is stored in the EEPROM 7. When the user desires to add a new cell station in the system for improving the traffic conditions, for example, the user can determine the most appropriate location for placing the new cell station based upon the information of the radio wave conditions surrounding each of the cell stations.

Next, a process performed by the cell stations for determining a timing for starting the superframe signal transmission cycle in accordance with a timing inputted by the user is explained.

Figure 16:
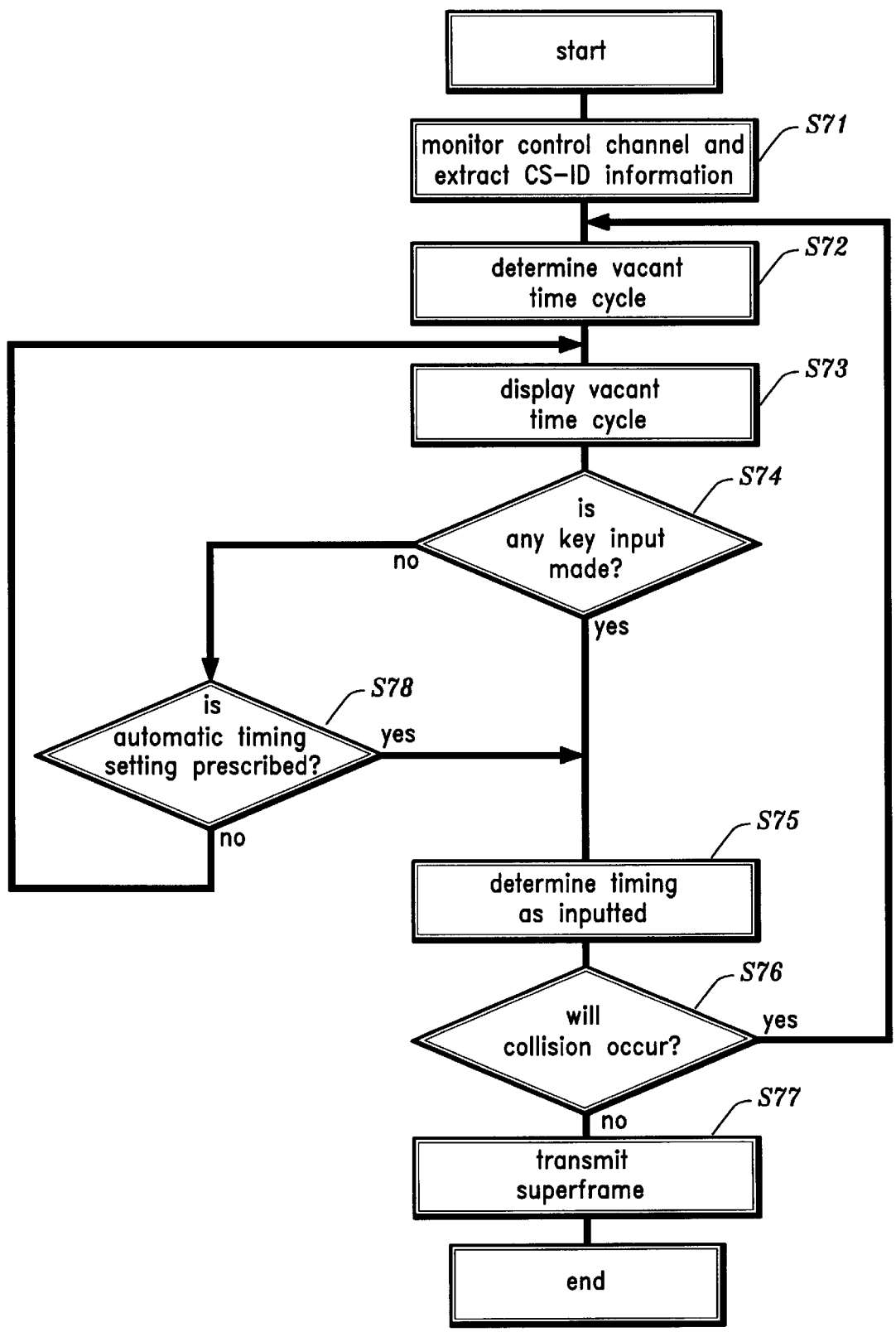
FIG. 16 is a flowchart illustrating an example of a process performed by the cell station to determine a timing for starting the cycle of transmitting the superframe signal in accordance with a timing inputted by the user.

FIG. 16 is a flowchart illustrating an example of the above-mentioned process. The process is performed by the communication controller 4 of each of the cell stations CS1, CS2, CS3.

In the process, when the power to cell station CS1, for example, is turned on, step S71 performs the process of monitoring the control channel signal and extracting the cell station identification information (CS-ID) from each of the received control signals for storing the information in the EEPROM 7, which corresponds to steps S2–S8 of FIG. 8.

Step S72 then performs the process of determining the vacant time cycle, which corresponds to the steps S22–S23 of FIG. 12.

Step S73 displays in the display 9 the vacant times cycle, together with the superframe signal transmission cycle of each of the other cell stations.

Step S74 then checks if any key input has been made via input key panel 10 for setting the start time of the superframe signal transmission cycle. If such a key input has been made, the process proceeds to step S75 to determine the start timings for multiple superframe signal transmission cycles using the inputted start time. Step S76 then checks if a collision will occur if the superframe signal is transmitted with the timing as inputted.

Whether or not a collision will occur is determined by comparing the start time of each of the superframe signal transmission cycles, which is determined as inputted as described above, with the start time of each of the superframe signal transmission cycles of the other cell stations, as explained previously referring to FIG. 13.

If the answer to the step S76 is YES, the process returns to the step S72 and if the answer to the step S76 is NO, the process proceeds to step S77 to transmit the superframe signal with the timing as determined.

If there is no key input in step S74, the process proceeds to step S78 to determine if a mode of automatically setting the timing to a predetermined timing is prescribed. For example, the cell station can be programmed to automatically set the start time to a predetermined value if a key input is not made within a predetermined amount of time. If the answer to step S78 is NO, the process returns to steps S73 and S74 to wait for a key input. If the answer to step S78 is YES, the process proceeds to step S75 to determine the start time for each cycle using the initial start time as automatically set. Step 76 then determines if a collision will occur. If yes, the process returns to step S72. If no, step S77 transmits the superframe signal with the timing as automatically set.

Figure 17:
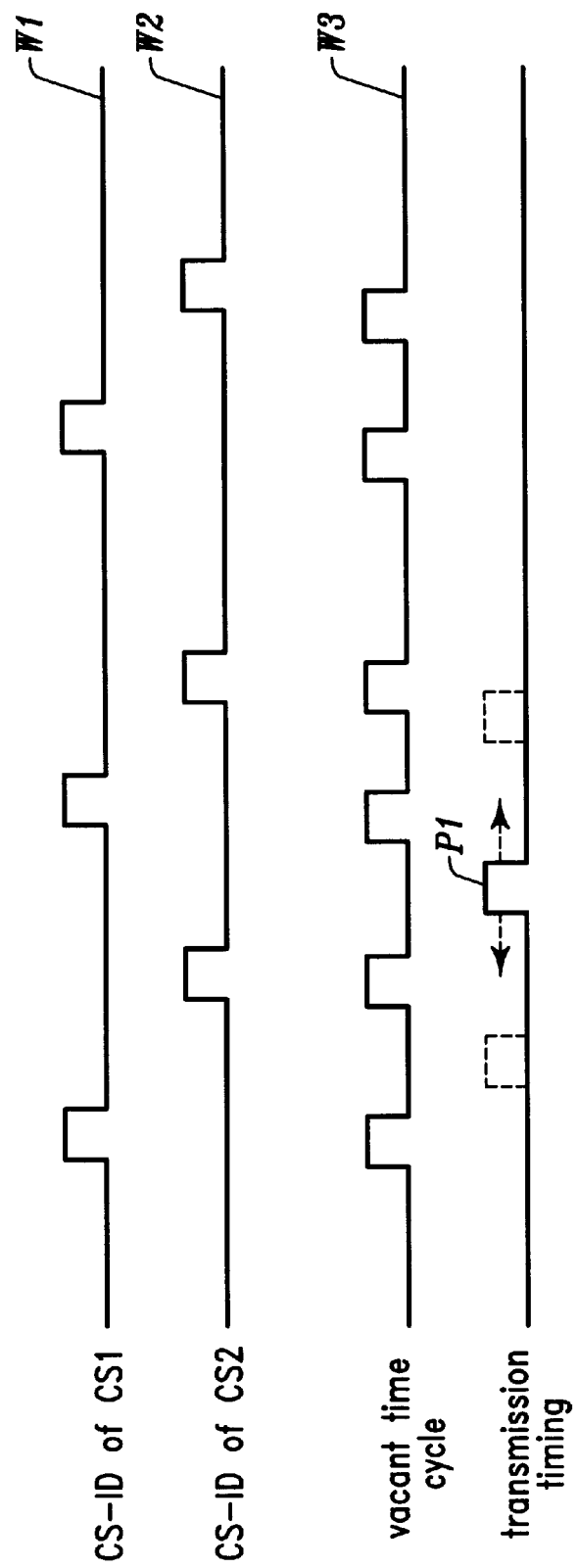
FIG. 17 is a diagram illustrating an example of a displayed diagram for inputting the timing of transmitting the superframe signal based upon the vacant time cycle in each of the superframe signal transmission cycles of the other cell stations.

FIG. 17 illustrates an example of a diagram displayed in the display 9 for inputting the start time of the superframe signal transmission cycle based upon the superframe signal transmission cycle of each of the other cell stations and the vacant time cycle during which the superframe signal is not transmitted by the other cell stations.

As illustrated in the drawing, the cell station identification (CS-ID) of the cell station CS1 along with a signal waveform W1 illustrating the superframe signal transmission cycle of the cell station CS1, and the cell station identification (CS-ID) of the cell station CS2 along with a signal waveform W2 illustrating the superframe signal transmission cycle of the cell station CS2 are displayed. In addition, a waveform W3 illustrating the vacant time cycle, during which the superframe signal is not transmitted by either cell station CS1 or cell station CS2 and which is determined based upon the superframe signal transmission cycle information of each of the cell stations CS1, CS2, is displayed.

The user may move a positioning curser P1, which illustrates a start time of the superframe signal transmission cycle of the cell station CS3, which the user is using, to a desired position, such as for example, to a position shown by one of the dotted lines.

If the user then selects the timing, as displayed, through manipulation of the key input panel 10, for determining the timing, the communication controller 4 determines the timing of starting the superframe signal transmission cycle as inputted.

A determination is then made whether transmission is possible using the input start time by determining if a collision will occur with the other signals using one of the methods described above. If the transmission is possible with the timing as determined, the controller 4 starts the transmission and if the transmission is not possible, the display 9 displays a message requesting the user to set the timing again.

Thus, the user can input the start time of the superframe signal transmission cycle while viewing in the display 9 the superframe signal transmission cycle of each of the other cell stations. Further, the user can confirm visually whether or not the superframe signal will collide with the superframe signal being transmitted by each of the other cell stations if the superframe signal is transmitted with the timing inputted by the user. Thus, the user can determine the start time of the superframe signal transmission cycle, so that collision will not occur.

Next, a process performed by the personal stations PS1, PS2, PS3 for determining a cell station for connection is explained.

Figure 18:
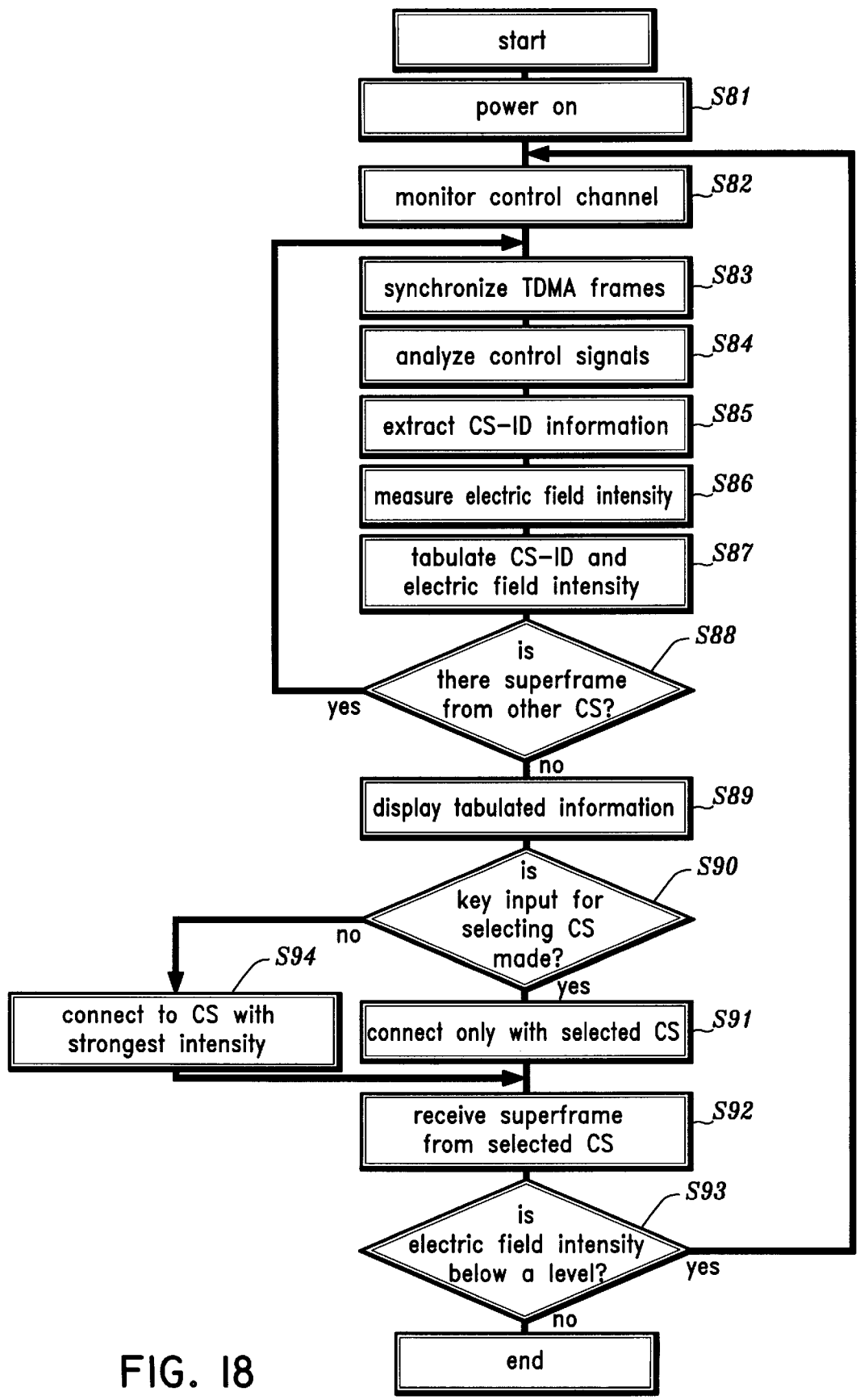
FIG. 18 is a flowchart illustrating an example of a process performed by personal station to determine a cell station for connection.

FIG. 18 is a flowchart illustrating an example of the above-mentioned process.

When the power to the personal station PS1, for example, is turned on in step S81, the communication controller 24 of the personal station PS1 starts monitoring the control channel signal and receives, in step S82, the superframe signal of each of the cell stations CS1, CS2, CS3. Step S83 frame synchronizes each of the received TDMA frames using the unique word (UW) 42 contained in each of the control channel signals.

Step S84 analyzes each of the received control channel signals and step S85 extracts the cell station identification information (CS-ID) from the control data (CAC) 44 contained in each of the control channel signals. Step S86 then measures the electric field intensity of the control channel signal received from each cell station. Step S87 tabulates the cell station identification information (CS-ID) and the corresponding electric field intensity information and stores the tabulated information in the EEPROM 27.

Step S88 then checks if there is any superframe signal being transmitted from any other cell station, and if the answer to step S88 is YES, the processes from S83 through S87 are repeated. If there is no other superframe signal being transmitted, the process proceeds to step S89 to display in the display 29 the cell station identification information (CS-ID) and the corresponding electric field intensity information stored in the EEPROM 27.

Step S90 then determines if any key input has been made through the input key panel 30 for selecting one of the displayed cell stations as the cell station for connection.

If a key input is made in step S90 via the input key panel 30, step S91 connects the personal station PS1 with the selected cell station and step S92 receives the superframe signal only from the selected cell station.

If a key input is not made within a predetermined period of time from the time the display 29 has displayed the information in step S89, the process proceeds to step S94 to connect the personal station PS1 with the cell station which has the strongest electric field intensity among the cell stations whose cell station identification information are stored in the EEPROM 27, and step S92 receives the control channel signal only from the connected cell station.

Then, step S93 monitors the electric field intensity of the control signal being received from the cell station that it is connected with and checks if the electric intensity of the control signal from the connected cell station reaches a level below a predetermined level.

If the answer to the step S93 is YES, the process returns to step S82 to start monitoring the control channel signal and receiving the superframe signals again. The controller 24 updates the information stored in the EEPROM 27 and selects the cell station for connection again based upon the updated information or may display in the display 29 a message asking if the user desires to change the cell station for connection.

If the electric field intensity of the control signal being received from the connected cell station does not reach a level below the predetermined level, the process ends.

Thus, when there are a plurality of the cell stations that have the same electric field intensity of the control signal, the user can select the cell station for connection from among the plurality of cell stations.

Therefore, for example, when it is known that the traffic of a certain cell station is relatively concentrated, the user can avoid selecting such a cell station for connection and can select a cell station whose traffic is relatively light.

Further, when the user moves with the personal station and the electric field intensity of the control signal from the connected cell station is weakened, the user can select the cell station having the strongest electric field intensity and switch the cell station for connection to a cell station having the strongest electric field intensity for maintaining the communication quality.

Now, the second embodiment of the present invention is explained.

When the radio communication system is used in a certain private closed area, such as for example, an area inside a building or a complex of buildings, two control channel signals with different frequencies are generally provided for avoiding frequent occurrence of busy traffic. In the PHS system, for example, frequencies of 1895.450 MHz and 1900.250 MHz are allocated for the control channel signals when the system is a private system.

Figure 19:
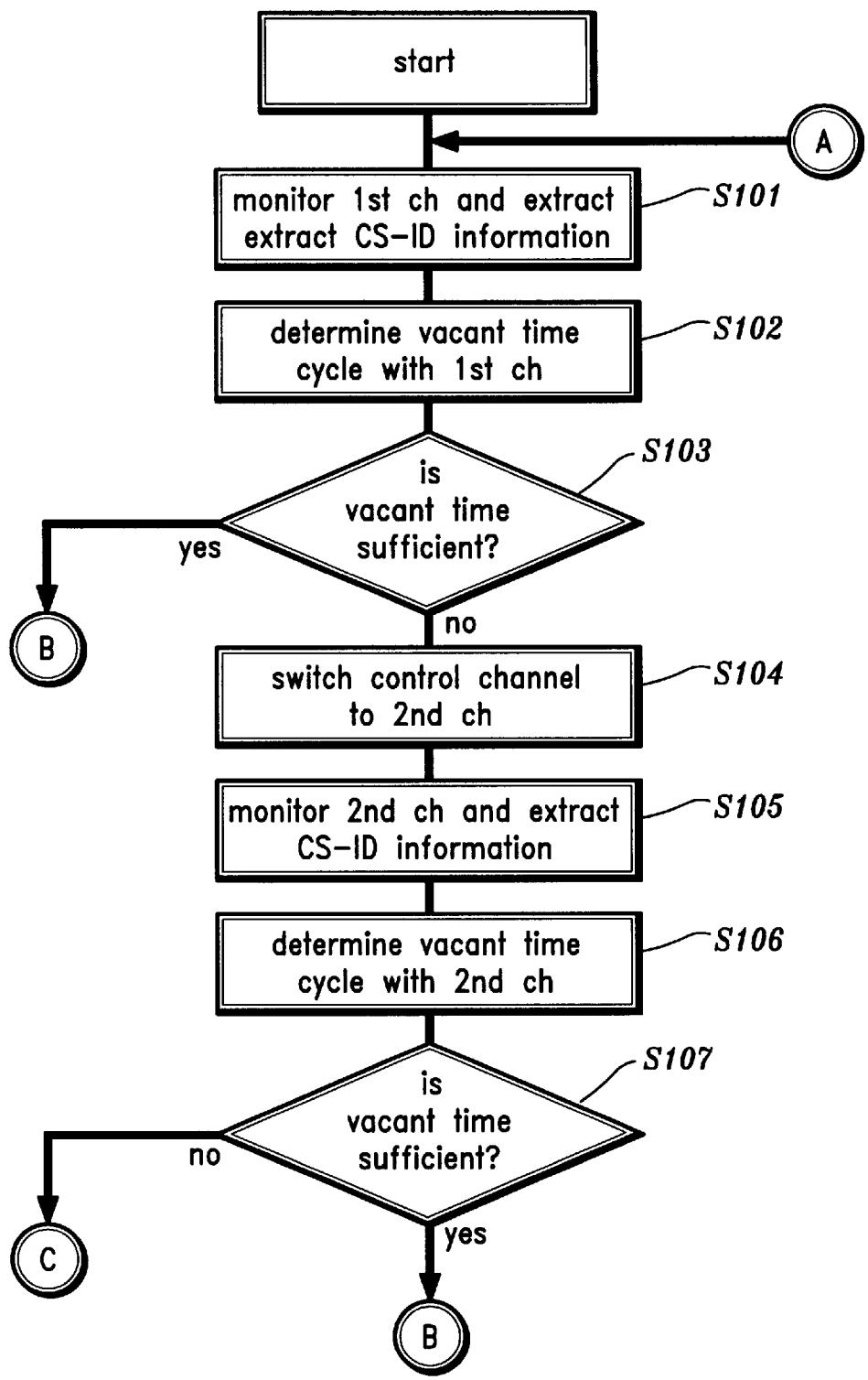
FIG. 19 is a flowchart illustrating a part of an example of a process performed by the cell station to monitor, when two control channels are provided in the system, both of the channels and to transmit the superframe signal with the control channel having less traffic.
Figure 20:
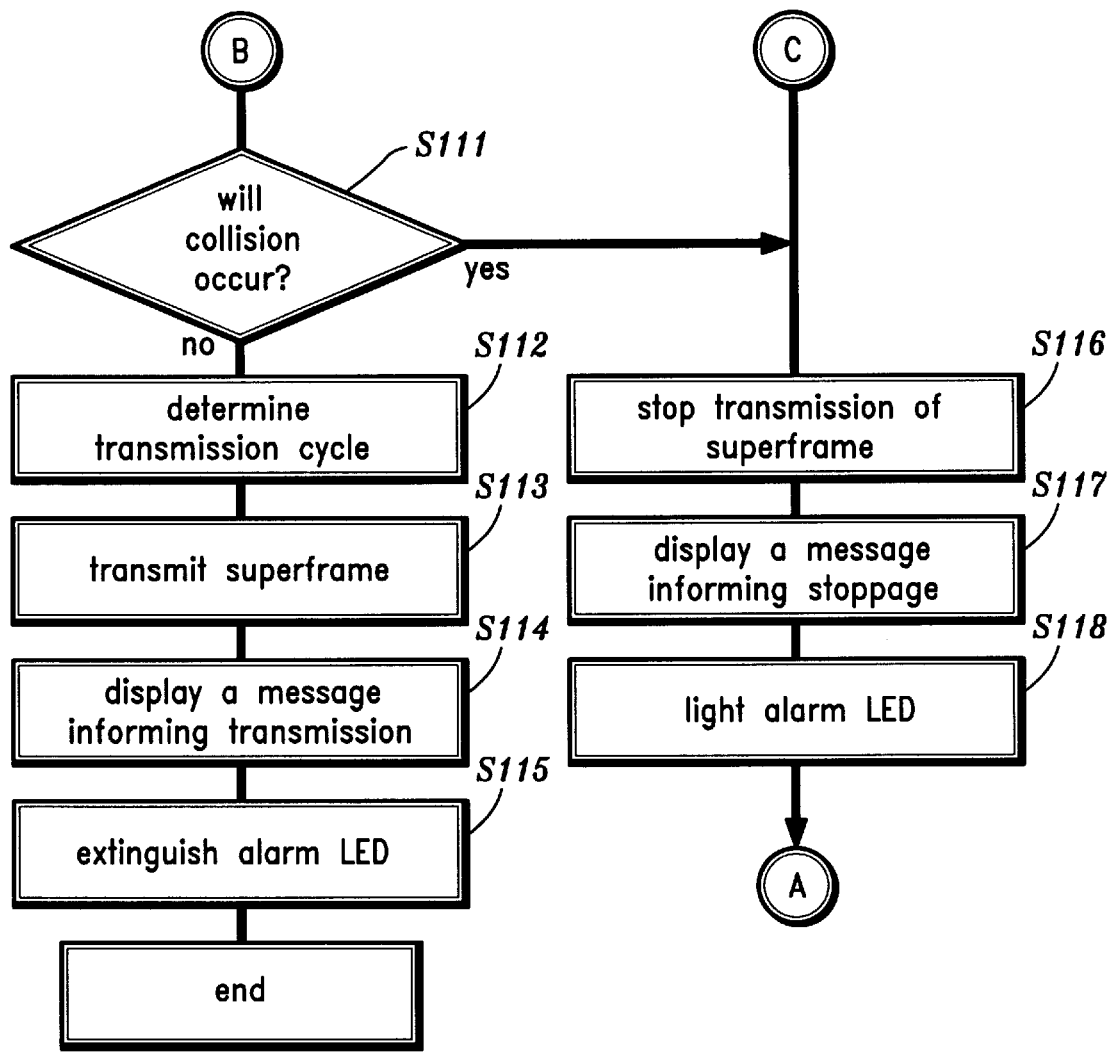
FIG. 20 is a flowchart illustrating another part of the process shown in FIG. 19.

In the radio communication system in the second embodiment, having two control channel signals with different frequencies, each cell station monitors each of the two control channel signals from the other cell stations and transmits the superframe signal with the control channel signal having lighter traffic FIGS. 19 and 20 are flowcharts illustrating an example of a process performed by the cell stations CS1, CS2, CS3 for monitoring, when two control channel signals with different frequencies are provided, both of the control channel signals and transmitting the superframe signal with the control channel signal having lighter traffic. In this example, the two control channel signals are hereinafter called a 1st control channel and a 2nd control channel respectively. As in the first embodiment, the communication controller 4 of each cell station performs this process.

When the power to the cell station CS1, for example, is turned on, step S101 performs, first, for the 1st control channel, the process of monitoring the control channel signal and extracting the cell station identification information (CS-ID) from each of the received superframe signals for storing the information in the EEPROM 7, which corresponds to the process of steps S2–S8 shown in FIG. 8.

Step S102 then performs the process of determining the vacant time cycle in each of the superframe signal transmission cycles of the other cell stations CS2, CS3, which corresponds to the processes in steps S22–S23 of FIG. 12.

Step S103 then determines if there is a sufficient vacant time cycle in the 1st control channel. As described previously, because one slot is 625 $\mu$s, it is determined that there is not sufficient vacant time if the vacant time is less than 1 ms in this embodiment. If there is not sufficient vacant time, step S104 switches the control channel signal from the 1st control channel to the 2nd control channel. Then, step S105 performs for the 2nd control channel the process of monitoring the control channel signal and extracting the cell station identification information (CS-ID) for storing the information in the EEPROM 7 as in the steps S101 for the 1st control channel, and step S106 performs the process of determining the vacant time cycle in each of the other cell stations as in the step S102 for the 1st control channel.

Then, step S107 checks if there is a sufficient vacant time cycle. If there is a sufficient vacant time cycle in step S107, the process proceeds to step S111 of FIG. 20 to determine whether or not the superframe signal will collide with any of the superframe signals being transmitted from the other cell stations if the superframe signal is transmitted during the vacant time cycle of the 2nd control channel as determined. If the answer to step S111 is NO, step S112 determines the superframe signal transmission cycle of the cell station CS1 which is determined as not causing collision in step S111.

Step S113 then transmits the superframe signal with the cycle as determined. Step S114 displays in the display 9 a message informing the user that the superframe signal is being transmitted and step S115 extinguishes the LED 12 informing the user that no failure has occurred during the superframe signal transmission.

If it is determined in step S111 that a collision will occur, the process proceeds to step S116 to stop the transmission of the superframe signal. Step S117 displays in display 9 a message informing the user that the transmission of the superframe signal has been stopped and step S118 lights the LED to indicate the stoppage of the transmission.

If it is determined in the step S107 of FIG. 19 that there is no sufficient vacant time cycle in the 2nd control channel also, the process proceeds to step S116 of FIG. 20 to stop the transmission of the superframe signal.

Thus, each of the cell stations CS1, CS2, CS3, when there are two control channel signals provided, can transmit the superframe signal with the control channel signal having lighter traffic.

In the above-mentioned second embodiment, alternatively, each of the cell stations may automatically switch the control channel signal for transmitting the superframe signal between the two control channel signals alternately after a predetermined period of time.

Figure 21:
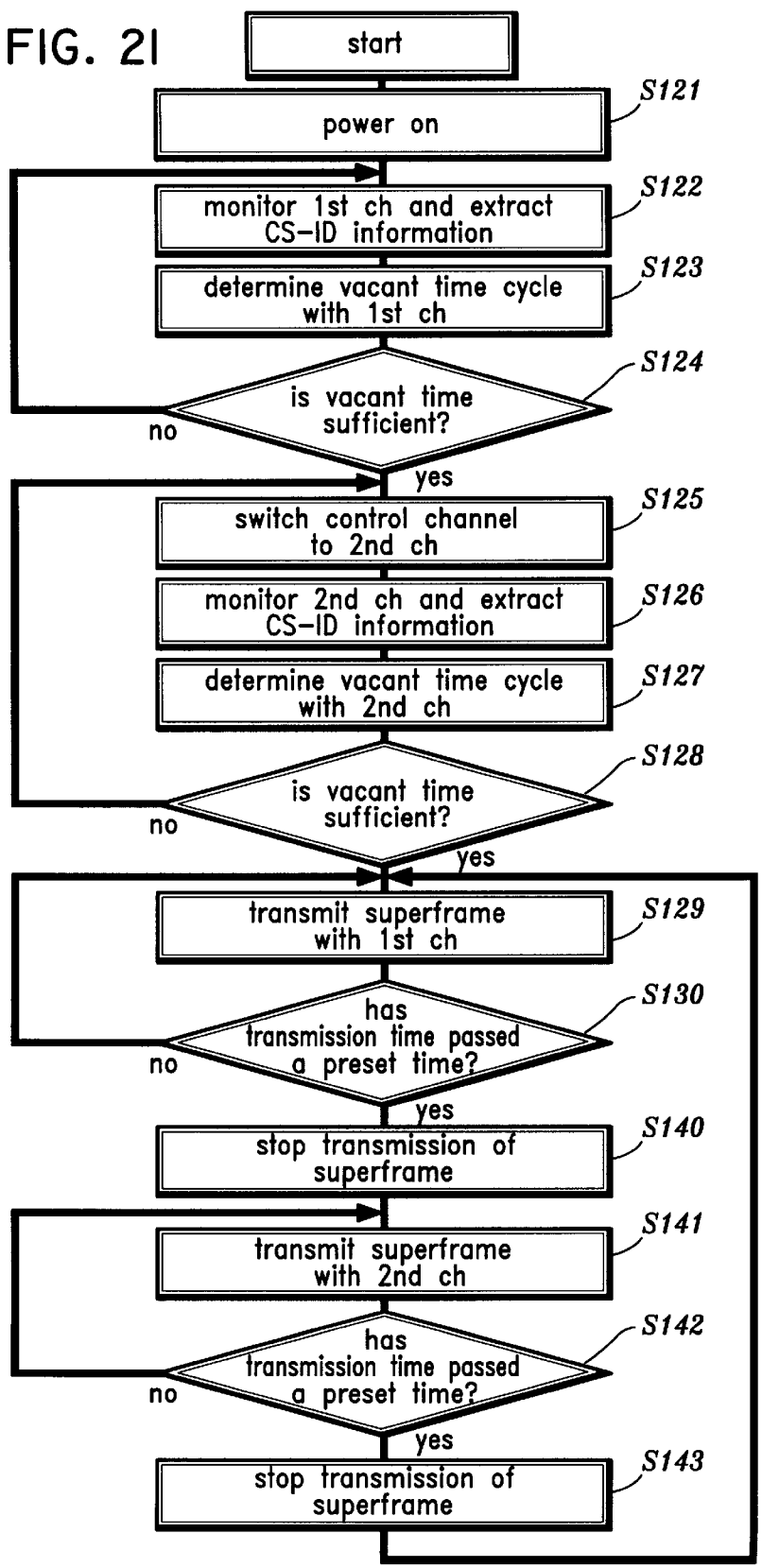
FIG. 21 is a flowchart illustrating an example of a process performed by the cell station to switch the control channel between the two channels for transmitting the superframe signal.

FIG. 21 is a flowchart illustrating an example of a process of switching the control channel signal between the two channels. The process is performed by the communication controller 4 of the cell stations CS1, CS2, CS3.

As illustrated in FIG. 21, if there is a sufficient vacant time cycle in each the 1st control channel and the 2nd control channel in the processes in steps S121–S128, step S129 starts transmission of the superframe signal with the 1st control channel and at the same time starts a timer. Step S130 then judges if a predetermined time "t" has passed, and if the answer to step S130 is NO, the transmission of the superframe signal with the 1st control channel is continued. If the answer to the step S130 is YES, the process proceeds to step S140 to stop the transmission of the superframe signal with the 1st control channel.

Step S141 then transmits the superframe signal with the 2nd control channel and starts the timer. Step S142 judges if the predetermined time "t" has passed, and if the answer to the step S142 is NO, the transmission of the superframe signal with the 2nd control channel is continued. If the answer to the step S142 is YES, the process proceeds to step S143 to stop the transmission with the 2nd control channel and return to the step S129.

Thus, each of the cell stations CS1, CS2, CS3 switches the control channel signal to transmit the superframe signal between the two channels alternately after the predetermined time "t".

Therefore, the radio communication system of this invention can avoid, when two control channel signals with different frequencies are provided, a situation in which the traffic of the control channel signal gets crowded onto one of the channels, even when the number of the cell stations in the system increases and the amount of traffic becomes busy.

Further in the above-mentioned embodiment, each of the cell stations CS1, CS2, CS3 may switch the control channel signal for transmitting the superframe signal between the two channels each time a request for connection is received from each of the personal stations PS1, PS2, PS3.

Figure 22:
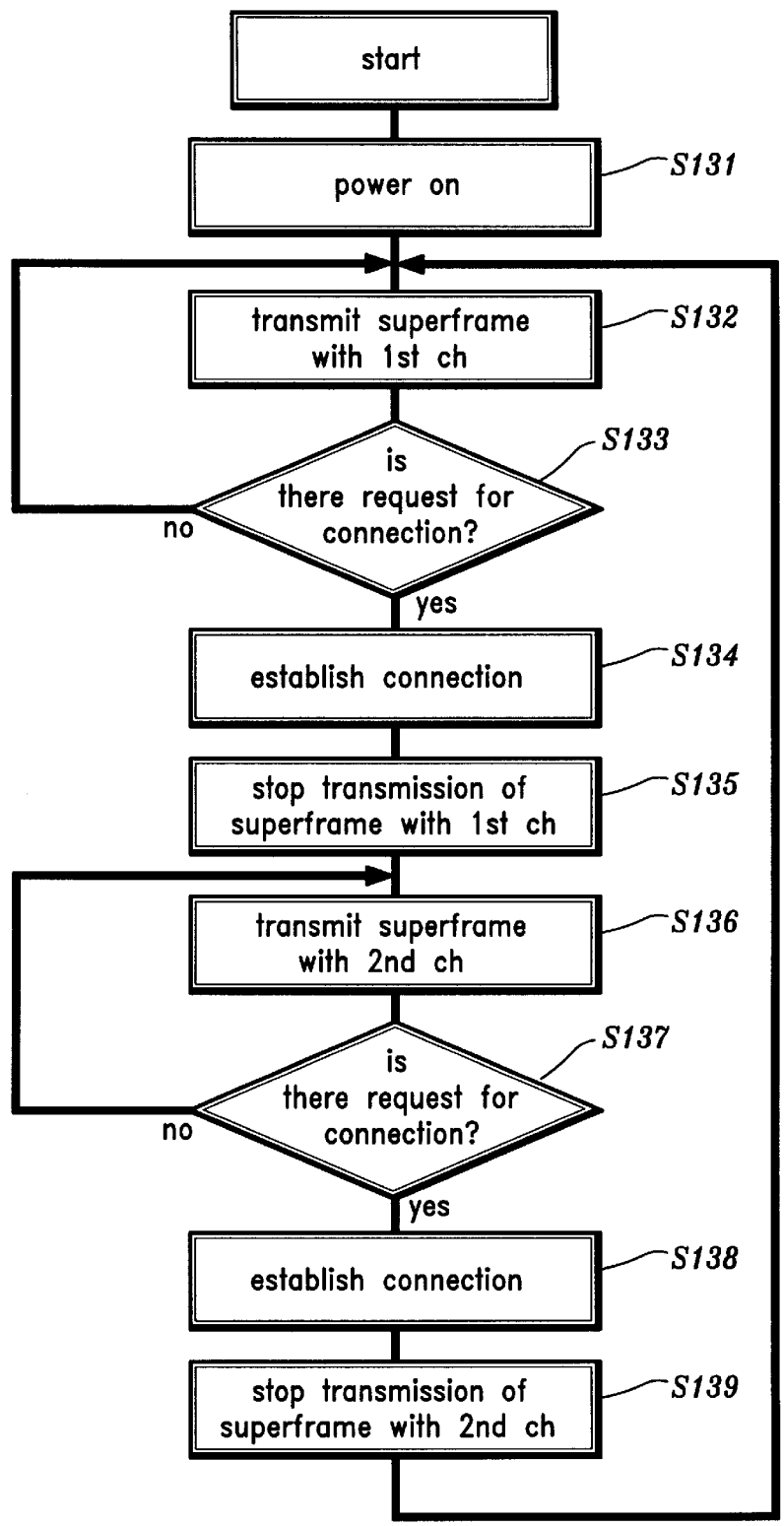
FIG. 22 is a flowchart illustrating an example of a process for switching the control channel for transmitting the superframe signal each time a request for establishing a radio connection is received from a personal station.

FIG. 22 is a flowchart illustrating an example of a process of switching the control channel signal for transmitting the superframe signal between the two channels each time a request for establishing a radio connection is received from a personal station.

When the power to the cell station CS1, for example, is turned on in step S131, the cell station CS1 performs a process of checking if there is a sufficient vacant time cycle in each of the 1st control channel and the 2nd control channel, and if there is a sufficient vacant time cycle in each of the two control channels, step S132 starts the transmission of the superframe signal with the 1st control channel.

Step S133 judges if there is a request for establishing a radio connection from any of the personal stations, and if there is no request the process returns to the step S132 to continue the transmission of the superframe signal with the 1st control channel. If there is a request for connection, the process proceeds to step S134 to perform a process of establishing the connection with the personal station from which the request for connection has been received, and step S135 stops the transmission of the superframe signal with the 1st control channel.

Figure 23:
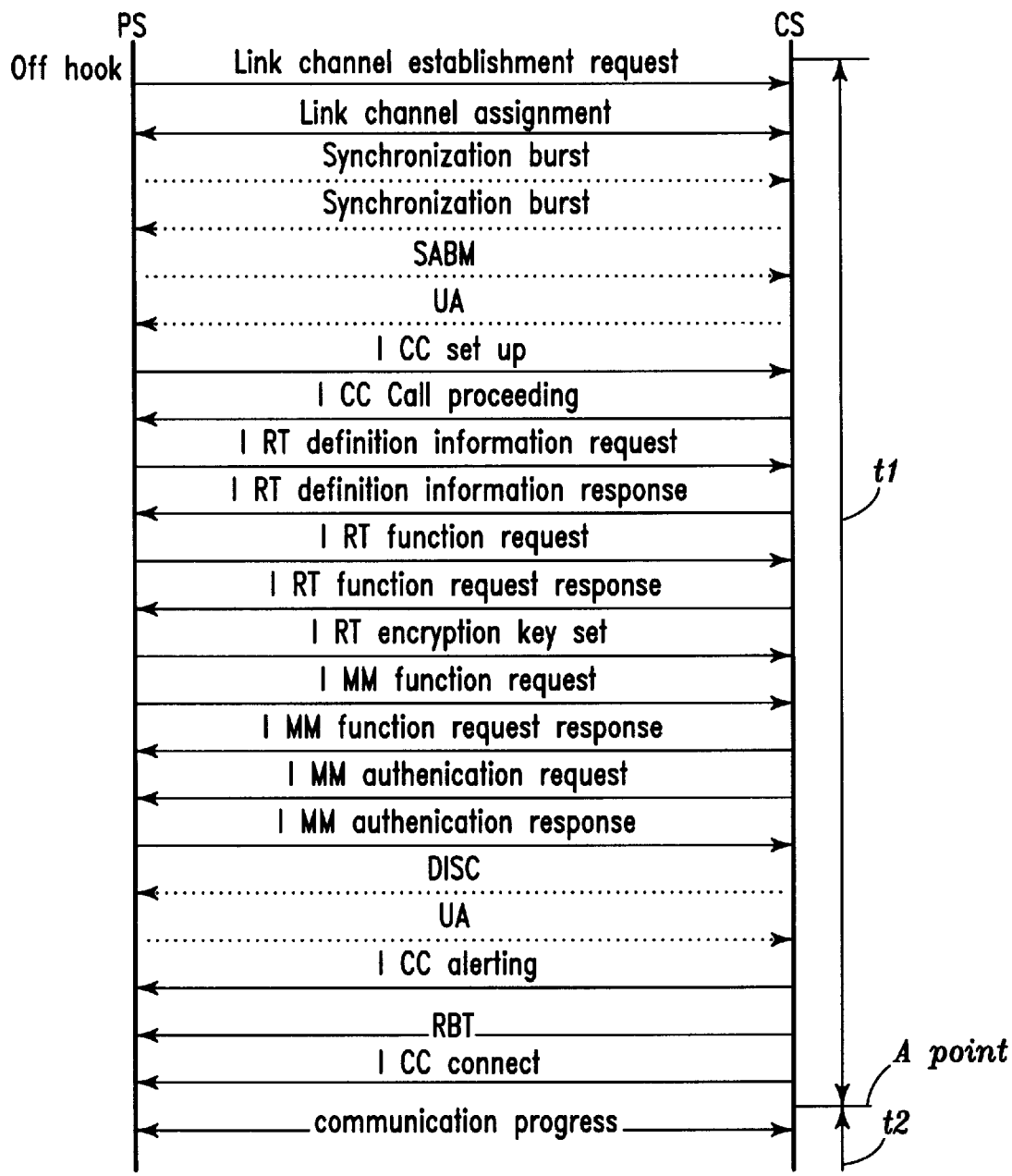
FIG. 23 is a chart illustrating an example of a sequence for establishing a radio connection between the cell station and the personal station.

FIG. 23 is a chart illustrating an example of a sequence for establishing a radio connection between a cell station and a personal station.

In FIG. 23, the communication controller 4 of the cell station CS1 stops the transmission of the superframe signal when the process between the cell station and the personal station moves from the sequences for the control channel, which are performed during a time denoted as ti in the drawing, and to the following sequences for the communication channel, which are performed during a time denoted as t2 in the drawing. Such timing of stopping the transmission of the superframe signal is indicated as point A in the drawing.

Then, step S136 (FIG. 22) switches the control channel signal for transmitting the superframe signal to the 2nd control channel and transmits the superframe signal with the 2nd control channel. Then, step S137 judges if there is any request for establishing a radio connection from any of the personal stations, and if there is no request the process returns to step S136 to continue the transmission of the superframe signal with the 2nd control channel. If there is a request for connection, the process proceeds to step S138 to perform the process of establishing a radio connection with the personal station from which the request for connection has been received and step S139 stops the transmission of the superframe signal with the 2nd control channel and returns to step S132.

Thus, each of the cell stations CS1, CS2, CS3 switches the control channel signal for transmitting the superframe signal between the two channels each time a request for establishing a radio connection is received from each of the personal stations PS1, PS2, PS3.

Therefore, the radio communication system of this invention, when two control channel signals with different frequencies are provided, can avoid a situation in which the traffic crowds onto one of two control channel signals, even when traffic with a particular personal station is busy.

Now, a process of the personal stations PS1, PS2, PS3 for connecting with the cell station, when each of the cell stations switches the control channel signal for transmitting the superframe signal between two control channels signals, is explained.

Figure 24:
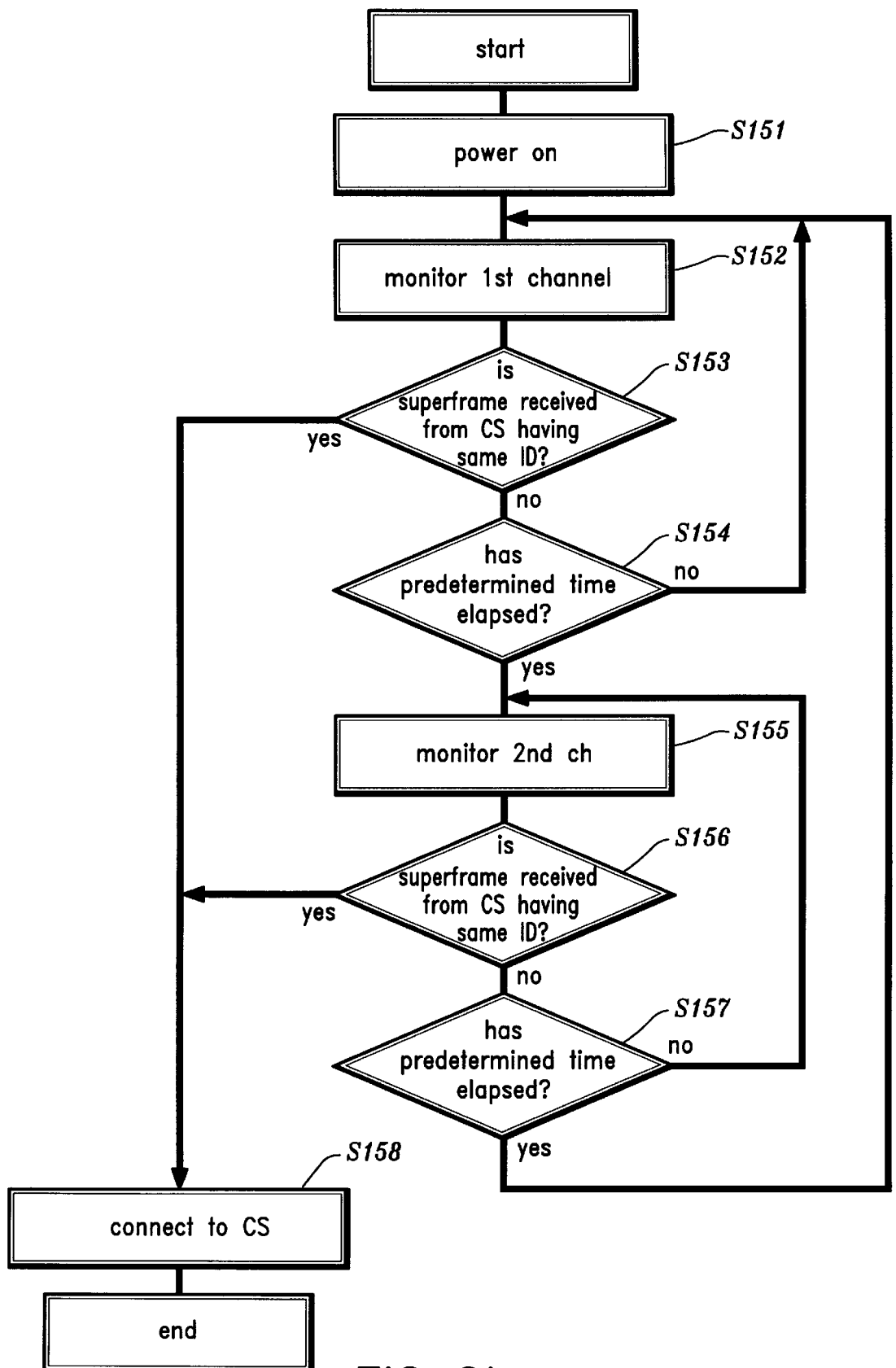
FIG. 24 is a flowchart illustrating an example of a process performed by the personal station for connecting with the cell station.

FIG. 24 is a flowchart illustrating an example of such process.

When the power to the personal station PS3, for example, is turned on in step S151, step S152 starts monitoring the 1st control channel and at the same time starts a timer. Step S153 checks if a superframe signal is received on the 1st channel from a cell station. If the answer to the step 143 is YES, the process proceeds to step S158 to connect to the cell station.

If the answer to the step S153 is NO, step S154 checks if a predetermined time "t" has elapsed. If the predetermined time has not elapsed in step S154, the process returns to the step S152 to continue monitoring the 1st control channel. If the predetermined time has elapsed in step S154, the process proceeds to step S155 to switch the control channel to the 2nd control channel and start the timer.

Then, step S156 checks if the superframe signal is received on the 2nd channel from a cell station. If the answer to the step S156 is YES, the process proceeds to step S158 to connect to the cell station.

If the answer to the step S156 is NO, step S157 checks if the predetermined time "t" has elapsed. If the answer to the step S157 is NO, the process returns to step S155 to continue the monitoring of the 2nd control channel. If the predetermined time has elapsed in the step S157, the process returns to step S152 to switch the control channel to the 1st control channel to monitor the 1st control channel again.

Thus, the personal station PS3 can connect to the cell station even when the cell station transmits the superframe signal with either of the two control channels.

Therefore, even if the traffic of the system increases and each of the cell stations switches the control channel signal for transmitting the superframe signal between the two channels, each of the personal stations can easily connect to the cell station.

Although the above-described embodiments include three sub-systems, each including a cell station and a personal station, the present invention can be applied to a radio communication system having any number of cell stations and personal stations.

Further, although the present invention has been explained for the case of the digital cordless telephone system, the invention can be applied to any radio communication system including a plurality of base stations which communicate with a plurality of radio terminals respectively, such as a wireless printer system including a plurality of printers, each of which communicates with a plurality of personal computers over radio waves, a wireless LAN system including a plurality of base stations, each of which is connected to a LAN cable and communicating with a plurality of terminals over radio waves.

Furthermore, the controller 4 of this invention may be conveniently implemented using a conventional microprocessor programmed according to the teachings of the present specification, as will be apparent to those skilled in the computer art. Appropriate software coding can readily be prepared by skilled programmers based upon the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

This application is based upon the Japanese patent application no. 08-077130 filed in the Japanese patent office on Mar. 29, 1996, the entire contents of which are hereby incorporated by reference.

What is claimed is:

1. A radio communication system including a plurality of base stations which communicate with a plurality of radio terminal stations respectively, each of said plurality of base stations comprising:

means for receiving a superframe signal including a control channel signal which is being transmitted at a certain interval by each of the other base stations in the system;

means for frame synchronizing TDMA frames of the control channel signals which are received by said control channel signal receiving means;

means for extracting base station identification information of each of the other base stations transmitting control channel signals respectively, from the TDMA frames which are frame synchronized by said TDMA frame synchronizing means;

means for storing in memory each of the base station identification information which is extracted by said base station identification information extracting means; and means for determining a cycle of transmitting said superframe signal in accordance with the number of the other base stations using the control channel in the system, which is determined based upon the base station identification information stored in the memory.

2. The radio communication system according to claim 1, each of said plurality of base stations further comprising:

means for extracting information of a superframe signal transmission cycle of each of the other base stations from the synchronized TDMA frames;

means for determining a vacant time cycle for transmitting said superframe signal based upon the superframe signal transmission cycle information extracted by said superframe signal transmission cycle information extracting means; and means for transmitting the superframe signal based upon the vacant time cycle determined by said vacant time cycle determining means.

3. The radio communication system according to claim 2, each of said plurality of base stations further comprising:

means for displaying the superframe signal transmission cycle information of each of the other base stations and the information of the vacant time cycle in each of the superframe signal transmission cycles of the other base stations, which is determined based upon the superframe signal transmission cycle information of each of the other base stations; and means for designating a timing of transmitting said superframe signal based upon the vacant time cycle information which is displayed by said displaying means.

4. The radio communication system according to claim 1, each of said plurality of base stations further comprising:

means for extracting information of a superframe signal transmission cycle of each of the other base stations from the synchronized TDMA frames;

means for determining a vacant time cycle for transmitting said superframe signal based upon the superframe signal transmission cycle information extracted by said superframe signal transmission cycle information extracting means;

means for determining whether transmission of the superframe signal is possible or not if the superframe signal is transmitted with the vacant time cycle determined by said vacant time cycle determining means; and means for stopping transmission of the superframe signal when the transmission of the superframe signal is determined as impossible by said determining means.

5. The radio communication system according to claim 4, each of said plurality of base stations further comprising:

means for indicating, when transmission of the superframe signal is stopped, that the superframe signal transmission has been stopped; and means for displaying a cause of the stoppage of the superframe signal transmission.

6. The radio communication system according to claim 1, each of said plurality of base stations further comprising:

means for measuring electric field intensity of the control channel signal of each of the other base stations based upon the synchronized TDMA frames;

means for storing information of the electric field intensity of the control channel signal of each of the other base stations, which is measured by said electric field intensity measuring means, in memory associating the electric field intensity information with the corresponding base station identification information; and means for displaying the base station identification information and the electric field intensity information of each of the other base stations which are stored in the memory by said storing means.

7. A radio communication system according to claim 1, wherein the receiving means receives the control channel signal when power is turned on.

8. The radio communication system according to claim 1, wherein said superframe signal is formed of a plurality of slots intermittently transmitted each cycle of a plurality of frames.

9. A radio communication system including a plurality of base stations which communicate with a plurality of terminal stations respectively, each of said plurality of terminal stations comprising:

means for monitoring, when the power is turned on, a control channel signal and receiving a superframe signal which is being transmitted by each of the base stations in the system;

means for frame synchronizing each TDMA frame of the received superframe signals;

means for extracting base station identification information of each of the base stations transmitting a superframe signal respectively from the synchronized superframe signals;

means for measuring electric field intensity of the control signal of each of the other base stations based upon the synchronized superframe signals;

means for storing the electric field intensity information in a memory associating the electric field intensity information with the corresponding base station identification information;

means for displaying the base station identification information and the electric field intensity information which are stored in the memory by said storing means;

means for selecting a base station for connection based upon the electric field intensity information displayed by said displaying means;

means for connecting to and intermittently receiving a superframe signal from the base station selected by said base station selecting means;

means for monitoring electric field intensity of the control channel signal being received from the connected base station, monitoring the control channel again when the electric field intensity of the control channel signal being received reaches a level below a predetermined level and receiving a superframe signal being transmitted by each of the other base stations, and updating the base station identification information and the electric field intensity information stored in the memory based upon the base station identification information and the electric field intensity information extracted from the received superframe signals;

means for displaying a message asking if the base station for connection is to be changed;

means for changing the base station for connection; and means for automatically connecting to the base station having the control channel signal with a strongest electric field intensity, which is determined based upon the base station identification information and the electric field intensity information updated by said updating means, when the base station for connection is not changed by said changing means.

10. A radio communications system including a plurality of base stations which communicate with a plurality of terminal stations respectively and wherein two control channel signals with different frequencies are provided, each of said plurality of base stations comprising:

means for receiving one of the two control channel signals with different frequencies, which is being transmitted at a certain interval by each of the other base stations in the system;

means for frame synchronizing each TDMA frame of the control channel signal which is received by said control channel signal receiving means;

means for extracting base station identification information of each of the other base stations from the TDMA frames which are frame synchronized by said TDMA frame synchronizing means;

means for storing in memory each base station identification information which is extracted by said base station identification information extracting means;

means for measuring traffic on said one of the two control channel signals;

means for receiving, when the traffic on said one of the two control channel signals reaches a predetermined level, the other control channel signal of said two control channel signals;

means for frame synchronizing each TDMA frame of said other control channel signal which is received by said other control channel signal receiving means;

means for extracting base station identification information from each of the TDMA frames of said other control channel signal which is frame synchronized by said TDMA frame synchronizing means synchronizing each of the TDMA frames of said other channel signal;

means for storing in memory the base station identification information which is extracted from each of the TDMA frames of said other control channel signal;

means for measuring traffic on said other control channel signal of said two control channel signals;

means for comparing the traffic on said two control channel signals to determine which traffic of said two control channel signals is lighter; and means for transmitting a superframe signal with the control channel signal having lighter traffic, of said two control channel signals.

11. A radio communication system according to claim 10, wherein the means for receiving the one of the two control channel signals receives the one of the two control channel signals when power is turned on.

12. A radio communications system including a plurality of base stations which communicate with a plurality of radio terminal stations respectively and wherein two control channel signals with different frequencies are provided, each of said plurality of base stations comprising:

means for transmitting a superframe signal with one of the two control channel signals with different frequencies;

means for measuring a time for transmitting a superframe signal when the superframe signal transmission is started with said one of the two control channel signals;

means for stopping the superframe signal transmission when the superframe signal transmitting time reaches a predetermined period of time;

means for transmitting the superframe signal with the other control channel signal of said two control channel signals when the superframe signal transmission with said one of the two control channel signals is stopped;

means for measuring the superframe signal transmitting time with said other control channel signal when the superframe signal transmission is started with said other control channel signal and stopping the superframe signal transmission when the superframe signal transmitting time with said other control channel signal reaches said predetermined period of time; and means for transmitting the superframe signal with said one of the two control channel signals again when the superframe signal transmission with said other control channel signal is stopped.

13. A radio communications system including a plurality of base stations which communicate with a plurality of radio terminal stations respectively and wherein two control channel signals with different frequencies are provided, each of said plurality of base stations comprising:

means for transmitting a superframe signal with one of the two control channel signals with different frequencies;

means for stopping the superframe signal transmission with said one of the two control channel signals when a request for connection is received from a terminal station; and means for transmitting the superframe signal, after stopping the superframe signal transmission with said one of the two control channel signals, with the other control channel signal of said two control channel signals.

14. A radio communications system including a plurality of base stations which communicate with a plurality of radio terminal stations respectively and wherein two control channel signals with different frequencies are provided, each of said plurality of terminal stations comprising:

means for monitoring one of the two control channel signals with different frequencies;

means for connecting, when a superframe signal is received from a base station with said one of the two control channel signals, to the base station;

means for monitoring the other control channel signal of said two control channel signals when a superframe signal is not received with said one of the two control channel signals within a predetermined period of time from a base station;

means for connecting, when a superframe signal is received from a base station with the other control channel signal of said two control channel signals, to the base station; and means for monitoring said one of the two control channel signals again when a superframe signal is not received with the other control channel signal in the predetermined period of time from a base station.

15. A method for communication of a radio communication system including a plurality of base stations which communicate with a plurality of radio terminal stations respectively, said method including steps performed by the base stations comprising:

receiving a superframe signal including a control channel signal which is being transmitted at a certain interval by each of the other base stations in the system;

frame synchronizing each of TDMA frames of the control channel signal which is received;

extracting base station identification information of each of the other base stations transmitting control channel signals respectively, from the TDMA frames which are frame synchronized;

storing each of the base station identification information which is extracted in a memory; and determining a cycle of transmitting said superframe signal in accordance with the number of the other base stations using the control channel in the system, which is determined based upon the base station identification information stored in the memory.

16. The method for communication according to claim 15, the steps performed by the base stations further comprising:

extracting information of a superframe signal transmission cycle of each of the other base stations from the synchronized TDMA frames;

determining a vacant time cycle for transmitting said superframe signal based upon the superframe signal transmission cycle information extracted by said superframe signal transmission cycle information extracting means; and transmitting the superframe signal based upon the vacant time cycle determined by said vacant time cycle determining means.

17. The method for communication according to claim 16, the steps performed by the base stations further comprising:

displaying the superframe signal transmission cycle information of each of the other base stations and the information of the vacant time cycle in each of the superframe signal transmission cycles of the other base stations, which is determined based upon the superframe signal transmission cycle information of each of the other base stations; and designating a timing of transmitting said superframe signal based upon the vacant time cycle information which is displayed by said displaying means.

18. The method for communication according to claim 15, the steps perfromed by the base stations further comprising:

extracting information of a superframe signal transmission cycle of each of the other base stations from the synchronized TDMA frames;

determining a vacant time cycle for transmitting said superframe signal based upon the superframe signal transmission cycle information extracted by said superframe signal transmission cycle information extracting means;

determining whether transmission of the superframe signal is possible or not if the superframe signal is transmitted with the vacant time cycle determined by said vacant time cycle determining means; and stopping transmission of the superframe signal when the transmission of the superframe signal is determined as impossible by said determining means.

19. The method for communication according to claim 18, the steps performed by the base stations further comprising:

indicating, when transmission of the superframe signal is stopped, that the superframe signal transmission has been stopped; and displaying a cause of the stoppage of the superframe signal transmission.

20. The method for communication according to claim 15, the steps performed by the base stations further comprising:

measuring electric field intensity of the control channel signal of each of the other base stations based upon the synchronized TDMA frames;

storing information of the electric field intensity of the control channel signal of each of the other base stations, which is measured by said electric field intensity measuring step, in the memory associating the electric field intensity information with the corresponding base station identification information; and displaying the base station identification information and the electric field intensity information of each of the other base stations which are stored in the memory by said storing step.

21. The method for communication according to claim 15, wherein said superframe signal is formed of a plurality of slots intermittently transmitted each cycle of a plurality of frames.

22. A method for communication of a radio communication system including a plurality of base stations which communicate with a plurality of terminal stations respectively, steps of the terminal stations comprising:

monitoring, when the power is turned on, a control channel signal and receiving a superframe signal which is being transmitted by each of the base stations in the system;

frame synchronizing each of TDMA frames of received superframe signals;

extracting base station identification information of each of the base stations transmitting a superframe signal respectively from the synchronized superframe signals;

measuring electric field intensity of the control signal of each of the base stations based upon the synchronized superframe signals;

storing the electric field intensity information in a memory associating the electric field intensity information with the corresponding base station identification information;

displaying the base station identification information and the electric field intensity information which are stored in the memory by said storing step;

selecting a base station for connection based upon the electric field intensity information displayed by said displaying step;

connecting to and intermittently receiving a superframe signal from the base station selected by said base station selecting step;

monitoring electric field intensity of the control channel signal being received from the base station connected, monitoring the control channel again when the electric field intensity of the control channel signal being received reaches a level below a predetermined level and receiving a superframe signal being transmitted by each of the other base stations, and updating the base station identification information and the electric field intensity information stored in the memory based upon the base station identification information and the electric field intensity information extracted from the received superframe signals;

displaying a message asking if the base station for connection to be changed;

changing the base station for connection; and connecting to the base station having the control channel signal with a strongest electric field intensity, which is determined based upon the base station identification information and the electric field intensity information updated by said updating step, when the base station for connection is not changed by said changing step.

23. A method for communication of a radio communications system including a plurality of base stations which communicate with a plurality of terminal stations respectively and wherein two control channel signals with different frequencies are provided, steps of the base stations comprising:

receiving, when the power is turned on, one of the two control channel signals with different frequencies, which is being transmitted at a certain interval by each of the other base stations in the system;

frame synchronizing each of TDMA frames of the control channel signal which is received by said control channel signal receiving step;

extracting base station identification information of each of the other base stations from the TDMA frames which are frame synchronized by said TDMA frame synchronizing step;

storing each of said base station identification information which is extracted by said base station identification information extracting step in a memory;

measuring a traffic of said one of the two control channel signals;

receiving, when the traffic of said one of the two control channel signals reaches a predetermined level, the other control channel signal of said two control channel signals;

frame synchronizing each of TDMA frames of said other control channel signal which is received by said other control channel signal receiving step;

extracting base station identification information from each of the TDMA frames of said other control channel signal which is frame synchronized by said TDMA frame synchronizing step synchronizing each of TDMA frames of said other channel signal; and storing each of the base station identification information which is extracted from each of the TDMA frames of said other control channel signal in a memory;

measuring a traffic of said other control channel signal of said two control channel signals;

comparing the traffics of said two control channel signals to determine which traffic of said two control channel signals is lighter; and transmitting a superframe signal with the control channel signal having lighter traffic, of said two control channel signals.

24. A method for communication of a radio communications system including a plurality of base stations which communicates with a plurality of radio terminal stations respectively and wherein two control channel signals with different frequencies are provided, steps of the base stations comprising:

transmitting a superframe signal with one of the two control channel signals with different frequencies;

measuring a time for transmitting a superframe signal when the superframe signal transmission is started with said one of the two control channel signals;

stopping the superframe signal transmission when the superframe signal transmitting time reaches a predetermined period of time;

transmitting the superframe signal with the other control channel signal of said two control channel signals when the superframe signal transmission with said one of the two control channel signals is stopped;

measuring the superframe signal transmitting time with said other control channel signal when the superframe signal transmission is started with said other control channel signal and stopping the superframe signal transmission when the superframe signal transmitting time with said other control channel signal reaches said predetermined period of time; and transmitting the superframe signal with said one of the two control channel signals again when the superframe transmission with said other control channel signal is stopped.

25. A method for communication of a radio communications system including a plurality of base stations which communicate with a plurality of radio terminal stations respectively and wherein two control channel signals with different frequencies are provided, steps of the base stations comprising:

transmitting a superframe signal with one of the two control channel signals with different frequencies;

stopping the superframe signal transmission with said one of the two control channel signals when a request for connection is received from a terminal station; and transmitting the superframe signal, after stopping the superframe signal transmission with said one of the two control channel signals, with the other control channel signal of said two control channel signals.

26. A method for communication of a radio communications system including a plurality of base stations which communicate with a plurality of radio terminal stations respectively and wherein two control channel signals with different frequencies are provided, steps of the terminal stations comprising:

monitoring one of the two control channel signals with different frequencies;

connecting, when a superframe signal is received from a base station with said one of the two control channel signals, to the base station;

monitoring the other control channel signal of said two control channel signals when a superframe signal is not received with said one of the two control channel signals in a predetermined period of time from a base station;

connecting, when a superframe signal is received from a base station with the other control channel signal of said two control channel signals, to the base station; and monitoring said one of the two control channel signals again when a superframe signal is not received with the other control channel signal in the predetermined period of time from a base station.

27. A radio communication system including a plurality of base stations which communicate with a plurality of radio terminal stations respectively, each of said plurality of base stations comprising:

a receiver for receiving a superframe signal including a control channel signal which is being transmitted at a certain interval by each of the other base stations in the system;

a TDMA frame synchronizer for frame synchronizing TDMA frames of the control channel signals which are received by said control channel signal receiver;

an identification extractor for extracting base station identification information of each of the other base stations transmitting control channel signals respectively, from the TDMA frames which are frame synchronized by said TDMA frame synchronizer;

a memory for storing the base station identification information which is extracted by said identification extractor; and a controller for determining a cycle of transmitting said superframe signal in accordance with the number of the other base stations using the control channel in the system, which is determined based upon the base station identification information stored in the memory.

28. The radio communication system according to claim 27, each of said plurality of base stations further comprising:

a superframe signal extractor for extracting information of a superframe signal transmission cycle of each of the other base stations from the synchronized TDMA frames;

a determiner for determining a vacant time cycle for transmitting said superframe signal based upon the superframe signal transmission cycle information extracted by said superframe signal transmission cycle information extracting means; and a transmitter for transmitting the superframe signal based upon the vacant time cycle determined by said vacant time cycle determining means.

29. The radio communication system according to claim 28, each of said plurality of base stations further comprising:

a display for displaying the superframe signal transmission cycle information of each of the other base stations and the information of the vacant time cycle in each of the superframe signal transmission cycles of the other base stations, which is determined based upon the superframe signal transmission cycle information of each of the other base stations; and a designator for designating a timing of transmitting said superframe signal based upon the vacant time cycle information which is displayed by said displaying means.

30. The radio communication system according to claim 27, each of said plurality of base stations further comprising:

a transmission cycle extractor for extracting information of a superframe signal transmission cycle of each of the other base stations from the synchronized TDMA frames;

a determiner for determining a vacant time cycle for transmitting said superframe signal based upon the superframe signal transmission cycle information extracted by said superframe signal transmission cycle information extracting means;

a transmission determiner for determining whether transmission of the superframe signal is possible or not if the superframe signal is transmitted with the vacant time cycle determined by said vacant time cycle determining means; and a controller for stopping transmission of the superframe signal when the transmission of the superframe signal is determined as impossible by said determining means.

31. The radio communication system according to claim 30, each of said plurality of base stations further comprising:

an indicator for indicating, when transmission of the superframe signal is stopped, that the superframe signal transmission has been stopped; and a display for displaying a cause of the stoppage of the superframe signal transmission.

32. The radio communication system according to claim 27, each of said plurality of base stations further comprising:

a measurer for measuring electric field intensity of the control channel signal of each of the other base stations based upon the synchronized TDMA frames;

a memory for storing information of the electric field intensity of the control channel signal of each of the other base stations, which is measured by said electric field intensity measurer, associating the electric field intensity information with the corresponding base station identification information; and a display for displaying the base station identification information and the electric field intensity information of each of the other base stations which are stored in the memory.

33. A radio communication system according to claim 27, wherein the receiver receives the control channel signal when power is turned on.

34. The radio communication system according to claim 27, wherein said superframe signal is formed of a plurality of slots intermittently transmitted each cycle of a plurality of frames.

35. A radio communication system including a plurality of base stations which communicate with a plurality of terminal stations respectively, each of said plurality of terminal stations comprising:

a receiver for monitoring, when power is turned on, a control channel signal and receiving a superframe signal which is being transmitted by each of the base stations in the system;

a frame synchronizer for frame synchronizing each TDMA frame of the received superframe signals;

an extractor for extracting base station identification information of each of the base stations transmitting a superframe signal respectively from the synchronized superframe signals;

a measurer for measuring electric field intensity of the control signal of each of the other base stations based upon the synchronized superframe signals;

memory for storing the electric field intensity information associating the electric field intensity information with the corresponding base station identification information;

a display for displaying the base station identification information and the electric field intensity information which are stored in the memory;

a selector for selecting a base station for connection based upon the electric field intensity information displayed by said display, the receiver connecting to and intermittently receiving a superframe signal from the base station selected by said selector;

a monitor for monitoring electric field intensity of the control channel signal being received from the connected base station, monitoring the control channel again when the electric field intensity of the control channel signal being received reaches a level below a predetermined level and receiving a superframe signal being transmitted by each of the other base stations, and updating the base station identification information and the electric field intensity information stored in the memory based upon the base station identification information and the electric field intensity information extracted from the received superframe signals;

a display for displaying a message asking if the base station for connection is to be changed;

a changer for changing the base station for connection; and an automatic connector for automatically connecting to the base station having the control channel signal with a strongest electric field intensity, which is determined based upon the base station identification information and the electric field intensity information updated by said updater, when the base station for connection is not changed by said changer.

36. A radio communications system including a plurality of base stations which communicate with a plurality of terminal stations respectively and wherein two control channel signals with different frequencies are provided, each of said plurality of base stations comprising:

a receiver for receiving one of the two control channel signals with different frequencies, which is being transmitted at a certain interval by each of the other base stations in the system;

a frame synchronizer for frame synchronizing each TDMA frame of the control channel signal which is received by said receiver;

an extractor for extracting base station identification information of each of the other base stations from the TDMA frames which are frame synchronized by said frame synchronizer;

memory for storing each base station identification information which is extracted by said extractor;

a measurer for measuring traffic on said control channel signals, wherein the receiver receives, when the traffic on said one of the two control channel signals reaches a predetermined level, the other control channel signal of said two control channel signals and said frame synchronizer synchronizes each TDMA frame of said other control channel signal which is received;

an extractor for extracting base station identification information from each of the TDMA frames of said other control channel signal which is frame synchronized by said synchronizer synchronizing each of the TDMA frames of said other channel signal;

memory for storing the base station identification information which is extracted from each of the TDMA frames of said control channel signals;

a comparator for comparing the traffic on said two control channel signals to determine which traffic of said two control channel signals is lighter; and a transmitter for transmitting a superframe signal with the control channel signal having lighter traffic, of said two control channel signals.

37. A radio communication system according to claim 36, wherein the receiver receives the control channel signals when power is turned on.

38. A radio communications system including a plurality of base stations which communicate with a plurality of radio terminal stations respectively and wherein two control channel signals with different frequencies are provided, each of said plurality of base stations comprising:

a transmitter for transmitting a superframe signal with one of the two control channel signals with different frequencies;

a measurer for measuring a time for transmitting a superframe signal when the superframe signal transmission is started with said one of the two control channel signals;

a controller for stopping the superframe signal transmission when the superframe signal transmitting time reaches a predetermined period of time, the transmitter transmitting the superframe signal with the other control channel signal of said two control channel signals when the superframe signal transmission with said one of the two control channel signals is stopped and the measurer measuring the superframe signal transmitting time with said other control channel signal when the superframe signal transmission is started with said other control channel signal and the controller stopping the superframe signal transmission when the superframe signal transmitting time with said other control channel signal reaches said predetermined period of time and the transmitter transmitting the superframe signal with said one of the two control channel signals again when the superframe signal transmission with said other control channel signal is stopped.

* * * * *